(12) United States Patent
Huang et al.

(10) Patent No.: US 9,276,678 B1
(45) Date of Patent: Mar. 1, 2016

(54) SCALABLE MULTI-SOURCE GPS SIGNAL DISTRIBUTION NETWORK

(71) Applicant: Google Inc., Mountain View, CA (US)

(72) Inventors: Zixia Huang, Santa Clara, CA (US); Marvin Weinstein, Mountain View, CA (US); Nicholas Ng, Palo Alto, CA (US); Ke Dong, San Jose, CA (US); Cedric Fung Lam, Belmont, CA (US); Tony Ong, San Jose, CA (US); Wenlei Dai, Fremont, CA (US)

(73) Assignee: Google Inc., Mountain View, CA (US)

( * ) Notice: Subject to any disclaimer, the term of this patent is extended or adjusted under 35 U.S.C. 154(b) by 33 days.

(21) Appl. No.: 14/338,623

(22) Filed: Jul. 23, 2014

(51) Int. Cl.
*H04B 10/08* (2006.01)
*H04B 10/118* (2013.01)
*H04B 10/079* (2013.01)

(52) U.S. Cl.
CPC .......... *H04B 10/118* (2013.01); *H04B 10/0791* (2013.01)

(58) Field of Classification Search
CPC .... H04B 10/118; H04B 10/0791; H04B 1/38; H04B 1/40
See application file for complete search history.

(56) References Cited

U.S. PATENT DOCUMENTS

| | | | |
|---|---|---|---|
| 6,731,707 B1 * | 5/2004 | Olofsson | H04J 3/0644 370/503 |
| 8,266,466 B2 | 9/2012 | Eshraghian et al. | |
| 2008/0186229 A1 * | 8/2008 | Van Diggelen | G01C 21/00 342/357.31 |
| 2009/0067850 A1 * | 3/2009 | Mizutani | H04J 3/0605 398/154 |
| 2011/0037652 A1 * | 2/2011 | Stafford | G01S 19/22 342/357.68 |
| 2012/0057865 A1 * | 3/2012 | Hasegawa | H04J 3/0655 398/16 |
| 2012/0065883 A1 * | 3/2012 | Williamson | G01C 21/165 701/501 |
| 2012/0299770 A1 * | 11/2012 | Lee | G01S 19/22 342/357.25 |
| 2013/0039220 A1 | 2/2013 | Ruffini et al. | |
| 2014/0079409 A1 | 3/2014 | Ruffini et al. | |
| 2014/0121795 A1 | 5/2014 | Snow | |
| 2015/0268352 A1 * | 9/2015 | Fischer | G01S 19/44 342/357.27 |

FOREIGN PATENT DOCUMENTS

| | | |
|---|---|---|
| WO | WO-2010017194 A1 | 2/2010 |
| WO | WO-2014005016 A1 | 1/2014 |

* cited by examiner

*Primary Examiner* — Dzung Tran
(74) *Attorney, Agent, or Firm* — Honigman Miller Schwartz and Cohn LLP

(57) ABSTRACT

A signal distribution system includes global positioning system receivers in communication with optical line terminals and a system manager. Each global positioning system receiver receives a signal from a corresponding global positioning system satellite. Each optical line terminal includes a management card and a line card. The management card receives a signal from a corresponding global positioning system receiver. Each line card receives a signal from each management card and determines a signal drift and a phase precision for each signal. The system manager receives a failure communication for a global positioning system signal from a line card when the signal drift of the global positioning system signal is above a threshold signal drift or the phase precision of the signal is below a threshold phase precision. The system manager identifies a failure location of the signal within the system based on one or more received failure communications.

30 Claims, 12 Drawing Sheets

SCALABLE MULTI-SOURCE GPS SIGNAL DISTRIBUTION NETWORK

TECHNICAL FIELD

This disclosure relates to a scalable and reliable multi-source GPS Signal distribution framework.

BACKGROUND

A communication network is generally a large distributed system for receiving information (e.g., a signal) and transmitting the information to a destination. Over the past few decades the demand for communication access has dramatically increased. Although conventional wire and fiber landlines, cellular networks, and geostationary satellite systems have continuously been increasing to accommodate the growth in demand, the existing communication infrastructure is still not large enough to accommodate the increase in demand. The growth in demand is mainly attributable to the coming together of different technological systems that perform similar tasks. These technological systems perform different functions, such as voice (e.g., telephone service), data (e.g., World Wide Web), and video (e.g., television broadcast), and have now converged and share the same resources and interact with each other synergistically. The telecommunications convergence led to the rise and advancement of digital communication due to the delivery of text, audio, and video over the same wired, wireless, or fiber optic connections.

Due to the constant increase in the number of devices that a communication network supports, telecommunication service providers have developed ways to distribute accurate time and information over the communication infrastructure. The communication infrastructure includes an optical line terminal (OLT) that sends a multiplexed signal (where the signal includes audio, video, and data signals) to a remote node, which ultimately distributes the received signal to multiple ends users. High-precision time is important in a communication network. For example, femtocell or picocell stations in 4G/LTE communication networks depend on the accurate time and frequency for time-division duplexing (TDD) and frequency-division duplexing (FDD). One of the methods used to improve the communication system is to configure the OLT as a master server that receives high-precision time directly from a satellite of a Global Positioning System (GPS) and delivers phase and frequency signals via IEEE-1588 Precision Time Protocol (PTP) or Synchronous Ethernet (SyncE).

Currently, GPS based time master server architecture supports a very limited number of clients due to constraints in the computation resources of the time master server. The time master server architecture fails to provide a scalable architecture due to its limited computation resources.

SUMMARY

One aspect of the disclosure provides a cascaded distribution framework that includes a global positioning system receiver in communication with optical line terminals. Each global positioning system receiver receives a signal from a corresponding global positioning system satellite. Each optical line terminal includes a management card for each global positioning system receiver in communication with the optical line terminal and a line card. The management card receives a global positioning system signal from a corresponding global positioning system receiver. The line card is collocated for each management card in the optical line terminal. Each line card receives a global positioning system signal from each management card in the optical line terminal, determines a signal quality score of each received signal based on a signal drift and a phase precision of the corresponding signal, and selects one of the received GPS signals having the highest signal quality score. Moreover, the line card uses a time of day component of the selected signal having the highest quality score.

Implementations of the disclosure may include one or more of the following features. In some implementations, the global positioning system receiver, the management cards, and the line cards each include a replicator. The replicator of each global positioning system receiver receives a global positioning system signal from its corresponding global positioning system satellite and replicates the received global positioning system signal for communication to the corresponding management card in each optical line terminal. The replicator of each management card receives a global positioning system signal from its corresponding global positioning system receiver and replicates the received global positioning system signal for communication to each line card in the optical line terminal. Moreover, the replicator of each line card receives global positioning system signals from each of the management cards of the optical line terminal and replicates the received global positioning system signals. The replicator may include a field programmable gate array, a fan-out buffer, or any programmable or application specific device.

In some examples, each line card includes multiple selectors. Each selector receives the replicated global positioning system signals from the replicator of the line card. Moreover, each selector determines the signal quality score of each received signal based on a signal drift and a phase precision of the corresponding signal and selects one of the received GPS signals having the highest signal quality score. In some implementations, each line card includes at least as many selectors as global positioning system receivers in the signal distribution system.

In some implementations, the global positioning system signal is associated with a source identification identifying a global positioning system satellite sending the global positioning system signal. The line card, after determining the signal quality score of each received signal, may associate a source identification with the determined signal quality score, store the signal quality score and the associated source identification in non-transitory memory, and select the source identification associated with the received signal having the highest signal quality score.

Each global positioning system signal may include a frequency signal component, a pulse per second signal component, and the time-of-day component. In some examples, the signal drift includes a drift of the pulse per second signal component and a drift of the frequency signal component. The line card determines the signal drift of a signal based on a total drift of a signal, the frequency drift of a signal, the pulse per second drift of the signal, and a function of the frequency drift and the pulse per second drift of the signal.

In some implementations, each line card includes multiple selectors. Each selector receives multiple global positioning system signals. In addition, the phase precision includes an offline measurement and an online measurement. The offline measurement is a measurement of a propagation delay of the pulse per second component of the global positioning system signal between the global positioning system receiver and the selector. The online measurement is a measurement of a relative phase offset of the pulse per second signal component.

The relative phase offset is determined based on a reference pulse per second reference signal. The reference signal may be the received pulse per second signal component received at the selector or a signal generated by a high-precision high-frequency oscillator. The line card determines the phase precision of the signal based on: the offline measurement of the propagation delay of the pulse per second signal component between the global positioning system receiver and the selector; and the online measurement of the relative phase offset of the pulse per second signal component. In addition, the line card determines the signal quality score based on a function for determining the signal quality score, and a convergence of a phase accuracy of the pulse per second signal component, which is in turn based on the phase precision of a signal and a median value of the received pulse per second signal component.

Another aspect of the disclosure provides a method that includes, for each optical line terminal in a signal distribution system, receiving a global positioning system signal from each global positioning system receiver in the signal distribution system at a corresponding management card of the optical line terminal. Moreover, the method includes, for each line card of each optical line terminal, receiving a global positioning system signal from each management card in the optical line terminal, determining a signal quality score of each received signal based on a signal drift and a phase precision of the corresponding signal, and selecting one of the received GPS signals having the highest signal quality score. The method includes using a time-of-day component of the selected global positioning system signal as a time source.

In some implementations, the method includes receiving a global positioning system signal from its corresponding global positioning system satellite at each global positioning system receiver and replicating the received global positioning system signal for communication to the corresponding management card in each optical line terminal. The method also includes receiving a global positioning system signal at each management card from its corresponding global positioning system receiver and replicating the received global positioning system signal for communication to each line card in the optical line terminal. Additionally, the method includes receiving global positioning system signals at each line card from each of the management cards of the optical line terminal and replicating the received global positioning system signals. In some examples, the method includes replicating the global positioning system signal using a field programmable gate array, a fan-out buffer, or any programmable or application specific device.

In some implementations, the method includes receiving, at multiple selectors in each line card, a global positioning system signal from each management card in the corresponding optical line terminal and determining a signal quality score of each received signal based on a signal drift and a phase precision of the corresponding signal. The method also includes selecting one of the received GPS signals having the highest signal quality score. In some examples, each line card includes at least as many selectors as global positioning system receivers in the signal distribution system.

In some implementations, the method further includes associating each global positioning system signal with a source identification that identifies a global positioning system satellite sending the global positioning system signal. After determining the signal quality score of each received signal, the line card may associate a source identification with the determined signal quality score and store the signal quality score and the associated source identification in non-transitory memory and select the source identification associated with the received signal having the highest signal quality score.

Each global positioning signal may include a frequency signal component, a pulse per second signal component, and the time-of-day component. Moreover, the signal drift may include a drift of the pulse per second signal component and a drift of the frequency signal component. In some examples, the method further includes determining the signal drift of a signal based on a total drift of a signal, the frequency drift of the signal, the pulse per second drift of the signal, and a function of the frequency drift and the pulse per second drift of the signal. Additionally, each line card may include multiple selectors. Each selector receives multiple global positioning system signals. The phase precision includes an offline measurement and an online measurement. The offline measurement is a measurement of a propagation delay of the pulse per second component of the global positioning system signal between the global positioning system receiver and the selector; and the online measurement is a measurement of a relative phase offset of the pulse per second signal component, the relative phase offset determined based on a reference pulse per second reference signal. In some implementations, the reference is the received pulse per second signal component received at the selector or a signal generated by a high-precision high-frequency oscillator. In some examples, the method further includes determining the phase precision of the signal based on the offline measurement and the online measurement. The method also includes determining the signal quality score based on a function for determining the signal quality score and a convergence of a phase accuracy of the pulse per second signal component (based on a median value of the received pulse per second signal component).

Another aspect of the disclosure provides a method that includes receiving global positioning system signals from global positioning system receivers. The global positioning system receivers receive the global positioning system signals from corresponding global positioning system satellites. The method also includes determining, using a selector circuit, a signal quality score of each received signal based on a signal drift and a phase precision of the corresponding signal and selecting, using the selector circuit, one of the received GPS signals having the highest signal quality score.

Implementations of the disclosure may include one or more of the following features. In some implementations, after determining the signal quality score of each received signal, the method further includes associating a source identification with the determined signal quality score. The source identification identifies a global positioning system satellite that sends the global positioning system signal. The method also includes storing the signal quality score and the associated source identification in non-transitory memory, and selecting the source identification associated with the received global positioning system signal having the highest signal score.

In some examples, each global positioning system signal includes a frequency signal component, a pulse per second signal component, and the time-of-day signal component. Moreover, the signal drift may include a drift of the pulse per second signal component and a drift of the frequency signal component. The method may include determining the signal drift of a signal based on a total drift of a signal, the frequency drift of the signal, the pulse per second drift of the signal, and a function of the frequency drift and the pulse per second drift of the signal. In some examples, the phase precision includes an offline measurement and an online measurement. The offline measurement is a measurement of a propagation delay of the pulse per second component of the global positioning system signal between the global positioning system receiver and the selector circuit. The online measurement is a measurement of a relative phase offset of the pulse per second signal component, the relative phase offset determined based on a reference pulse per second reference signal. In some examples, the reference signal is the received pulse per second signal component received at the selector or a signal generated by a high-precision high-frequency oscillator. The method may also include determining the phase precision of the signal based on the phase precision of a signal, the offline measurement, and the online measurement. In some examples, the method includes determining the signal quality score based on a function for determining the signal quality score and a convergence of a phase accuracy of the pulse per second signal component (determined based on a median value of the received pulse per second signal component and the phase precision of the signal).

In some implementations, the method further includes iterating through each of the global positioning system signals from global positioning system receivers and, for each iteration, receiving a primary signal including a currently selected global positioning system signal having the highest signal quality score and a secondary signal including the global positioning system signal of the corresponding iteration. In addition, after iterating through all of the global positioning system signals from global positioning system receivers, the method includes: determining the signal quality score of each received signal based on a signal drift and a phase precision of the corresponding signal; and selecting the global positioning system signal having the highest signal quality score as the primary signal. In some examples, at each iteration, the method also includes receiving a source identification of the primary signal and a source identification of the secondary signal. Additionally, when the received primary signal source identification does not match a source identification of the currently selected global positioning system signal, the method includes triggering an error.

In some implementations, when receiving, at a selector, a rising edge of a pulse per second signal component of the global positioning system signal, the method includes setting a bi-directional pin to an input pin and receiving the primary and optionally the secondary signal source identification. Moreover, when receiving a falling edge of the pulse per second signal component of the global positioning system signal, the method includes setting the bi-directional pin to an output pin and outputting the primary signal source identification and the secondary signal source identification. In some examples, when receiving a rising edge of the pulse per second signal component of the global positioning system signal, the method includes comparing the received primary signal source identification with the primary signal source identification outputted after the previous falling edge of the pulse per second signal component and triggering an error when the primary signal source identifications do not match.

In some examples, the method includes receiving, at a replicator, the global positioning system signals from the global positioning system receivers. The replicator replicates the global positioning system signals. The method also includes receiving the global positioning system signals at multiple selectors in communication with the replicator. Each selector receives from the replicator a global positioning system signal from each global positioning system receiver, determines a signal quality score of each received signal based on a signal drift and a phase precision of the corresponding signal, and selects one of the received GPS signals having the highest signal quality score. Moreover, the line card uses a time of day component of the selected signal having the highest quality score.

Another aspect of the disclosure provides a signal source selector system that includes a receiver circuit and a selector circuit is in communication with the receiver circuit. The receiver circuit receives global positioning system signals from global positioning system receivers. The global positioning system receivers receive the global positioning system signals from corresponding global positioning system satellites. The selector circuit determines a signal quality score of each received signal based on a signal drift and a phase precision of the corresponding signal and selects one of the received GPS signals having the highest signal quality score. Moreover, the line card uses a time of day component of the selected signal having the highest quality score.

In some implementations, after determining the signal quality score of each received signal, the selector circuit associates a source identification with the determined signal quality score. The source identification identifies a global positioning system satellite sending the global positioning system signal. In addition, the selector circuit stores the signal quality score and the associated source identification in non-transitory memory in communication with the selector circuit and selects the source identification associated with the received global positioning system signal having the highest signal score. Each global positioning system signal includes a frequency signal component, a pulse per second signal component, and the time-of-day signal component. In some examples, the signal drift includes a drift of the pulse per second signal component and a drift of the frequency signal component. The selector circuit may determine the signal quality of a signal based on a total drift of a signal, the frequency drift of a signal, the pulse per second drift of the signal, and a function of the frequency drift and the pulse per second drift of the signal. The phase precision may include an offline measurement and an online measurement. The offline measurement is a measurement of a propagation delay of the pulse per second component of the global positioning system signal between the global positioning system receiver and the selector circuit. The online measurement is a measurement of a relative phase offset of the pulse per second signal component, the relative phase offset determined based on a reference pulse per second reference signal. In some examples, the reference signal is the received pulse per second signal component received at the selector circuit or a signal generated by a high-precision high-frequency oscillator. The selector circuit may determine the phase precision of the signal based on the online and offline measurements. Moreover, the selector circuit may determine the signal quality score based on a function for determining the signal quality score and a convergence of a phase accuracy of the pulse per second signal component (determined based on the phase precision signal and a median value of the received pulse per second signal component).

In some implementations, the selector circuit iterates through each of the global positioning system signals from global positioning system receivers. For each iteration, the selector circuit requests and receives from the receiver circuit a primary signal that includes a currently selected global positioning system signal having the highest signal quality score and a secondary signal including the global positioning system signal of the corresponding iteration. After iterating through all of the global positioning system signals from global positioning system receivers, the selector circuit determines the signal quality score of each received signal based on a signal drift and a phase precision of the corresponding signal and selects the global positioning system signal having the highest signal quality score as the primary signal. The selector circuit may request and receive from the receiver circuit a source identification of the primary signal and a source identification of the secondary signal. Moreover, when the selector circuit receives a primary signal source identification from the receiver circuit not matching a source identification of the currently selected global positioning system signal, the selector circuit triggers an error in the system. In some examples, the receiver circuit includes multiple output pins and one bi-directional pin, and the selector circuit includes an equal number of input pins as output pins of the receiver circuit and one bi-directional pin. The output pins of the receiver circuit are in communication with the corresponding input pins of the selector circuit, and the bi-directional pin of the receiver circuit is in communication with the bi-directional pin of the selector circuit. When the receiver circuit receives a rising edge of a pulse per second signal component of the global positioning system signal, the receiver circuit sets its bi-directional pin to an output pin outputting an identification of the primary signal and optionally the secondary signal. In addition, when the receiver circuit receives a falling edge of the pulse per second signal component of the global positioning system signal, the receiver circuit sets its bi-directional pin to an input pin and receives the primary signal source identification and the secondary signal source identification from the selector circuit. When the selector circuit receives a rising edge of the pulse per second signal component of the global positioning system signal, the selector circuit sets its bi-directional pin to an input pin and receives the primary source identification and optionally the secondary signal source identification from the receiver circuit. Moreover, when the selector circuit receives a falling edge of the pulse per second signal component of the global positioning system signal, the selector circuit sets its bi-directional pin to an output pin, and outputs the primary signal source identification and the secondary signal source identification. In some implementations, when the receiver circuit receives a falling edge of the pulse per second signal component of the global positioning system signal, the receiver circuit changes sources of global positioning system signals for the primary and secondary signals to sources corresponding to the received primary signal source identification and the received secondary signal source identification. Moreover, when the selector circuit receives a rising edge of the pulse per second signal component of the global positioning system signal, the selector circuit compares the primary signal source identification received from the receiver circuit with the primary signal source identification outputted to the replicator after the previous falling edge of the pulse per second signal component and triggers an error in the system when the primary signal source identifications do not match. In some examples, the receiver circuit and the selector circuit are on a system-on-chip, or many other types of devices.

In some implementations, the system further includes a replicator that receives and replicates global positioning system signals from global positioning system receivers. The global positioning system receivers receive the global positioning system signals from corresponding global positioning system satellites. The system also includes multiple selector circuits in communication with the replicator, each selector circuit receives from the replicator a global positioning system signal from each global positioning system receiver, determines a signal quality score of each received signal based on a signal drift and a phase precision of the corresponding signal, and selects one of the received GPS signals having the highest signal quality score. Moreover, the line card uses a time of day component of the selected signal having the highest quality score.

Another aspect of the disclosure provides a signal distribution system that includes global positioning system receivers, optical line terminals, and a system manager. Each global positioning system receiver receives a global positioning system signal from a corresponding global positioning system satellite. The optical line terminals are in communication with the global positioning system receivers. In some implementations, each optical line terminal includes one or more management cards for each global positioning system receiver in communication with the optical line terminal. The management card receives a global positioning system signal from a corresponding global positioning system receiver. Each optical line terminal also includes a line card collocated for each management card in the optical line terminal. Each line card receives a global positioning system signal from each management card in the optical line terminal and determines a signal drift and a phase precision for each global positioning system signal. The system manager executes on a data processing device in communication with the global positioning system receivers and the optical line terminals. The system manager receives a failure communication for a global positioning system signal from a line card when the signal drift of the global positioning system signal is above a threshold signal drift or the phase precision of the global positioning system signal is below a threshold phase precision. Moreover, the system manager identifies a failure location of the global positioning system signal within the system based on one or more received failure communications.

Implementations of the disclosure may include one or more of the following features. In some implementations, the system manager identifies a management card of an optical line terminal as a failure location when every line card of that optical line terminal identifies a failure of a global positioning system signal while other line cards of other optical line terminals do not identify a failure of that global positioning system signal. Additionally or alternatively, in some examples, the system manager identifies a global positioning system receiver as a failure location when the line cards of every optical line terminal identifies a failure of a global positioning system signal while at least some of the line cards of the optical line terminals do not identify a failure of a global positioning system signal from another global positioning system receiver.

In some examples, the global positioning system receivers, the management cards, and the line cards each include a replicator. The replicator of each global positioning system receiver receives a global positioning system signal from its corresponding global positioning system satellite and replicates the received global positioning system signal for communication to the corresponding management card in each optical line terminal. The replicator of each management card receives a global positioning system signal from its corresponding global positioning system receiver and replicates the received global positioning system signal for communication to each line card in the optical line terminal. Moreover, the replicator of each line card receives global positioning system signals from each of the management cards of the optical line terminal and replicates the received global positioning system signals. Each line card includes multiple analyzer circuits, each receiving the replicated global positioning system signals from the replicator of the line card. In addition each analyzer circuit determines the signal drift and the phase precision for each global positioning system signal, compares the signal drift of each global positioning system signal with the threshold signal drift, compares the phase precision of each global positioning system signal with the threshold phase precision, and determines a failure of the global positioning system signal when the signal drift of the global positioning system signal is above the threshold signal drift or the phase precision of the global positioning system signal is below the threshold phase precision. In some examples, the system manager identifies an analyzer circuit as a failure location when that analyzer circuit identifies a failure of a global positioning system signal while other analyzer circuits do not identify a failure of that global positioning system signal. The system manager may identify an analyzer circuit as a failure location when that analyzer circuit identifies a failure of a global positioning system signal while all or a statistically significant number of other analyzer circuits do not identify a failure of that global positioning system signal. Moreover, the system manager may identify the replicator of a line card as a failure location when the analyzer circuits of that line card each identify a failure of a global positioning system signal while other analyzer circuits of other line cards of the same optical line terminal do not identify a failure of that global positioning system signal.

In some implementations, the system manager identifies the replicator of a management card of an optical line terminal as a failure location when the analyzer circuits of every line card of that optical line terminal identifies a failure of a global positioning system signal while other analyzer circuits of other optical line terminals do not identify a failure of that global positioning system signal. Additionally or alternatively, the system manager identifies the replicator of a global positioning system receiver as a failure location when the analyzer circuits of every optical line terminal identifies a failure of a global positioning system signal while at least some of the analyzer circuits of the optical line terminals do not identify a failure of a global positioning system signal from another global positioning system receiver.

Each global positioning system signal includes a frequency signal component, a pulse per second signal component, and a time-of-day component. The signal drift includes a drift of the pulse per second signal component and a drift of the frequency signal component. The line card may determine the signal drift of a signal based on a total drift of a signal, the frequency drift of the signal, the pulse per second drift of the signal, and a function of the frequency drift and the pulse per second drift of the signal.

The phase precision includes an online measurement and an offline measurement. The offline measurement is a measurement of a propagation delay of the pulse per second component of the global positioning system signal between the global positioning system receiver and the analyzer circuit; while the online measurement is a measurement of a relative phase offset of the pulse per second signal component. The relative phase offset is determined based on a reference pulse per second reference signal. The reference signal may be the received pulse per second signal component received at the analyzer circuit or a signal generated by a high-precision high-frequency oscillator. In some examples, the line card determines the phase precision of the signal based on the online and offline measurements.

Another aspect of the disclosure provides a method that includes receiving a failure communication for a global positioning system signal from a signal distribution system when the signal drift of the global positioning system signal is above a threshold signal drift or the phase precision of the global positioning system signal is below a threshold phase precision. The signal distribution system includes global positioning system receivers and optical line terminals. Each global positioning system receiver receives a global positioning system signal from a corresponding global positioning system satellite. The optical line terminals are in communication with the global positioning system receivers. Each optical line terminal includes a management card and a line card collocated for each management card in the optical line terminal. The management card for each global positioning system receiver is in communication with the optical line terminal. The management card receives a global positioning system signal from a corresponding global positioning system receiver. Each line card receives a global positioning system signal from each management card in the optical line terminal and determines a signal drift and a phase precision for each global positioning system signal. The method also includes identifying a failure location of the global positioning system signal within the system based on one or more received failure communications.

In some implementations, the method includes identifying a line card as a failure location when the line card identifies a failure of a global positioning system signal while other line cards of the same optical line terminal do not identify a failure of the global positioning system signal. Additionally or alternatively, the method may include identifying a management card of an optical line terminal as a failure location when every line card of that optical line terminal identifies a failure of a global positioning system signal while other line cards of other optical line terminals do not identify a failure of that global positioning system signal. The method may include identifying a global positioning system receiver as a failure location when the line cards of every optical line terminal identifies a failure of a global positioning system signal while at least some of the line cards of the optical line terminals do not identify a failure of a global positioning system signal from another global positioning system receiver.

In some implementations, the global positioning system receivers, the management cards, and the line cards each include a replicator. The replicator of each global positioning system receiver receives a global positioning system signal from its corresponding global positioning system satellite and replicates the received global positioning system signal for communication to the corresponding management card in each optical line terminal. The replicator of each management card receives a global positioning system signal from its corresponding global positioning system receiver and replicates the received global positioning system signal for communication to each line card in the optical line terminal. The replicator of each line card receives global positioning system signals from each of the management cards of the optical line terminal and replicates the received global positioning system signals. Each line card includes multiple analyzer circuits, each receiving the replicated global positioning system signals from the replicator of the line card. Moreover, each analyzer circuit may determine the signal drift and the phase precision for each global positioning system signal, compare the signal drift of each global positioning system signal with the threshold signal drift, compare the phase precision of each global positioning system signal with the threshold phase precision, and determine a failure of the global positioning system signal when the signal drift of the global positioning system signal is above the threshold signal drift or the phase precision of the global positioning system signal is below the threshold phase precision. The method may further include identifying an analyzer circuit as a failure location when that analyzer circuit identifies a failure of a global positioning system signal while other analyzer circuits do not identify a failure of that global positioning system signal.

The method may include identifying the replicator of a line card as a failure location when the analyzer circuits of that line card each identify a failure of a global positioning system signal while other analyzer circuits of other line cards of the same optical line terminal do not identify a failure of that global positioning system signal. Additionally or alternatively, the method may include identifying the replicator of a management card of an optical line terminal as a failure location when the analyzer circuits of every line card of that optical line terminal identifies a failure of a global positioning system signal while other analyzer circuits of other optical line terminals do not identify a failure of that global positioning system signal. Furthermore, additionally or alternatively, the method may include identifying the replicator of a global positioning system receiver as a failure location when the analyzer circuits of every optical line terminal identifies a failure of a global positioning system signal while at least some of the analyzer circuits of the optical line terminals do not identify a failure of a global positioning system signal from another global positioning system receiver.

In some examples, each global positioning system signal includes a frequency signal component, a pulse per second signal component, and the time-of-day component, the signal drift including a drift of the pulse per second signal component and a drift of the frequency signal component. The method may include determining the signal drift of a signal. Moreover, the phase precision may include an offline measurement and an online measurement. The offline measurement is a measurement of a propagation delay of a pulse per second component of the global positioning system signal between the global positioning system receiver and the analyzer circuit. The online measurement is a measurement of a relative phase offset of the pulse per second signal component, the relative phase offset determined based on a reference pulse per second reference signal. The reference signal is the received pulse per second signal component received at the analyzer circuit or a signal generated by a high-precision high-frequency oscillator. The method may include determining the phase precision of the signal based on the offline and online measurements.

Yet another aspect of the disclosure provides a method that includes, for each optical line terminal in a signal distribution system, receiving a global positioning system signal from each global positioning system receiver in the signal distribution system at a corresponding management card of the optical line terminal. The method also includes, for each line card of each optical line terminal receiving a global positioning system signal from each management card in the optical line terminal and determining a signal drift and a phase precision for each global positioning system signal. When the signal drift of a global positioning system signal is above a threshold signal drift or the phase precision of the global positioning system signal is below a threshold phase precision, the method includes identifying a failure location of the global positioning system signal within the system.

In some implementations, the method further includes identifying a line card as a failure location when the line card identifies a failure of a global positioning system signal while other line cards of the same optical line terminal do not identify a failure of the global positioning system signal, identifying a management card of an optical line terminal as a failure location when every line card of that optical line terminal identifies a failure of a global positioning system signal while other line cards of other optical line terminals do not identify a failure of that global positioning system signal, and identifying a global positioning system receiver as a failure location when the line cards of every optical line terminal identifies a failure of a global positioning system signal while at least some of the line cards of the optical line terminals do not identify a failure of a global positioning system signal from another global positioning system receiver.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

A communication network generally needs precision timing; therefore, the clocks of its individual devices should be synchronized. Clock synchronizing allows for synchronizing multiple devices or multiple communication networks, which leads to facilitating inter-network handoff of data. Accurate time becomes increasingly important with the surge of wireless application, such as 4G/LTE that include, for example, femtocell or picocell. LTE (Long-Term Evolution, also known as 4G LTE) is a wireless communication standard for high-speed data for mobile phones and data terminals. LTE networks utilize improved digital signal processing techniques and modulations to increase the capacity and speed of wireless data networks. Femtocell and picocell are small cells that provide in-building and outdoor wireless service that allows a provider to extend its service coverage and/or increase network capacity. Therefore, communication service providers are constantly considering ways to maintain the time accuracy of their ever expanding network, to ultimately distribute very accurate time information over an Ethernet (e.g., gigabit) infrastructure to remote residential houses.

Figure 1A:
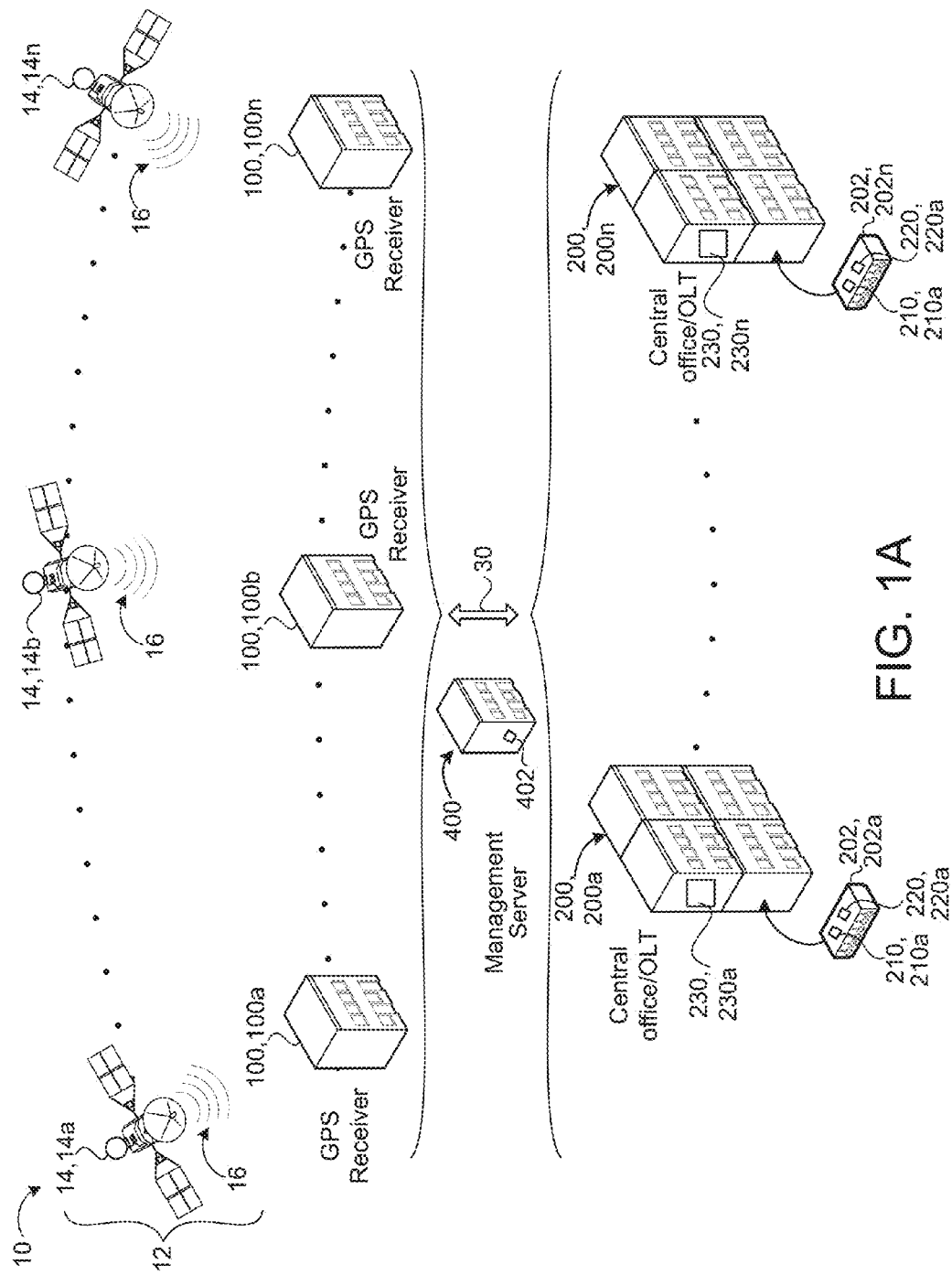
FIGS. 1A and 1B are schematic views of an exemplary multi-source global positioning satellite distribution framework.
Figure 1B:
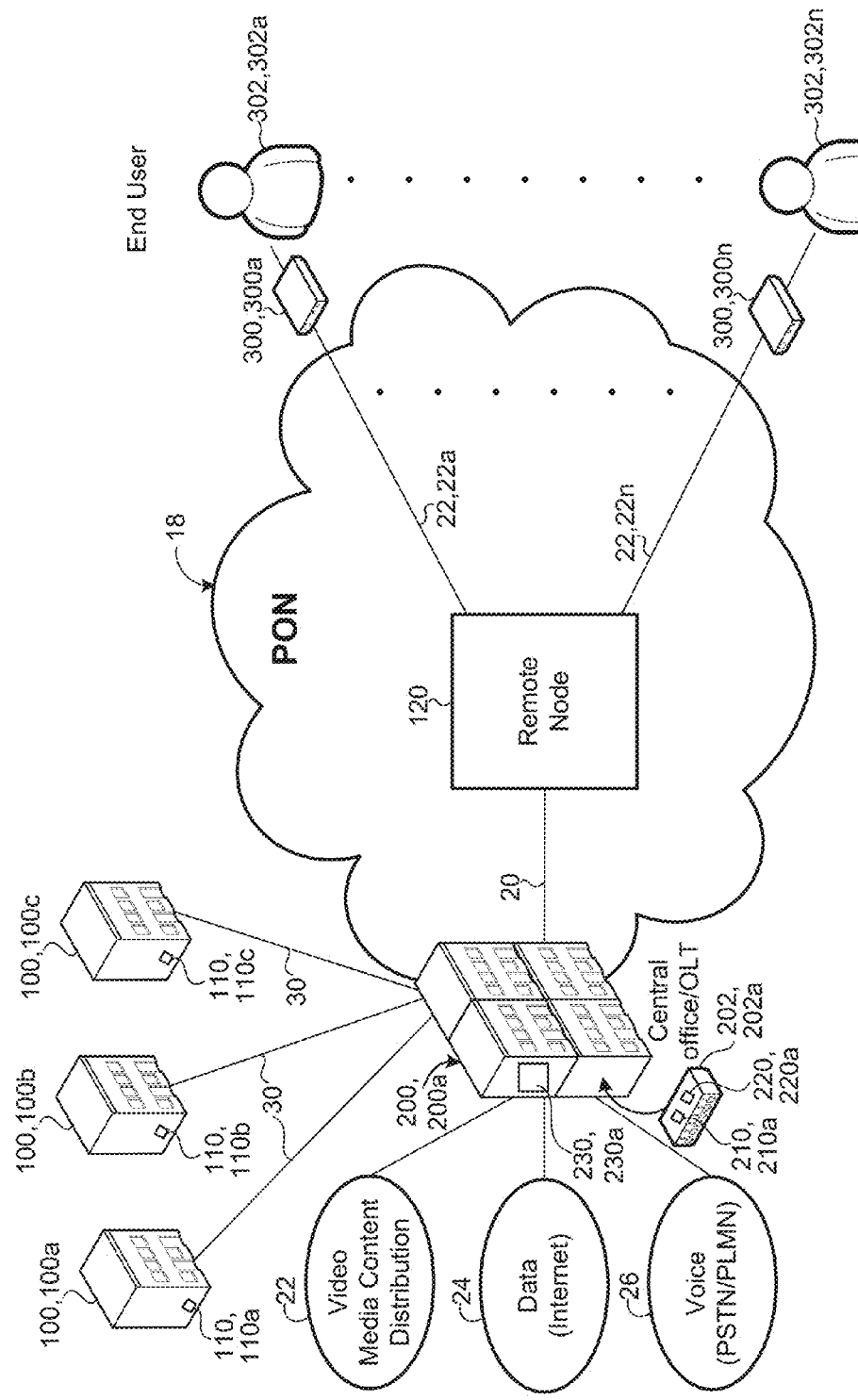

Referring to FIGS. 1A and 1B, in some implementations, the communication network 10 includes a Global Positioning System (GPS) 12 that includes satellites 14 configured to communicate with one another and with GPS receivers 100. The GPS 12 provides location and time information to the GPS receivers 100 (via antenna data 16) as long as there is an unobstructed line of sight between more than one satellite 14 and the receiver 100 (e.g., at least three satellites 14 and the receiver 100). Communication networks 10 (signal distribution systems) use the time provided by the GPS 12 to synchronize all of their devices (such as, but not limited to, the central offices (CO) 200, remote nodes 120, end user devices 300) and transmit accurate time to its end users 302.

In some implementations, the GPS receiver 100 is in communication with at least three satellites 14 within the GPS 12. The satellites 14 transmit information to the GPS receivers 100 while orbiting the earth (e.g., twice a day) in a precise orbit. The GPS receiver 100 compares the time that the satellite 14 transmitted antenna data 16 with the time the GPS receiver 100 received the antenna data 16. The time difference is indicative of the distance that the satellite 14 is from the GPS receiver 100. The antenna data 16 that the GPS satellite 14 transmits to the GPS receiver 100 may include a pseudorandom code, ephemeris data, and almanac data. The pseudorandom code includes an identification that identifies which satellite 14 is transmitting the antenna data 16. The ephemeris data includes the status of the satellite 14 and the current date and time. Finally, the almanac data includes information relating to the position of each GPS satellite 14 at any time throughout each day. In some examples, each satellite 14 transmits almanac data that includes information relating to the satellite 14 and other satellites 14 within the system 12. Moreover, each antenna data 16 includes a source identification that identifies a GPS satellite 14 that is sending the antenna data 16, i.e., the source of the signal 30. The GPS receiver 100 converts the received antenna data 16 to a signal 30 before transmitting the signal 30.

GPS 12 is beneficial for determining the time because it is capable of distributing antenna data 16 to a wide area (e.g., GPS 12 includes multiple satellites 14), and the path delay between a satellite-based transmitter and a ground-based GPS receiver 100 is usually more stable and is more accurately modeled than the corresponding delay between the stations of a purely ground-based system. Therefore, it is desirable to provide a communication network 10 capable of supporting the next-generation 4G/LTE wireless applications and capable of distributing accurate time information over gigabit Ethernet infrastructure to end users 302 (e.g., remote residential houses, buildings, or businesses) connected to the communication network 10 via an endpoint device 202 (e.g., optical line terminal (OLT)). A device endpoint 202 may be any device that is the endpoint at the CO 200 of the optical network. Moreover, it is desirable to provide a scalable communication system 10 capable of expanding to support more users 302. Specifically, it is desirable to provide a communication system 10 capable of expanding to support a scalable OLT 202 having an increasing number of management cards (MCs) 210. The communication system 10 receives signals 30 from multiple GPS receivers 100 for redundancy, provides a selection method for selecting the most accurate signal 30 received (e.g., time) from the multiple GPS receivers 100, and determines which GPS receiver 100 is providing the most accurate time. Furthermore, it is also desirable to provide a communication system 10 capable of configuring its components (e.g., in real time) to determine which component within its distribution system experiences a failed condition. The communication system 10 provides a cascaded GPS signal distribution framework that delivers phase and frequency information to a scalable number of devices at the endpoint device 202, such as MCs 210 and line cards (LCs) 220 in an OLT 202. In some examples, the endpoint device 202 includes MCs 210 only or LCs 220 only, a combination of other devices performing the same function.

Referring to FIGS. 1A and 1B, a central office (CO) 200 receives information, such as video media distribution 22, internet data 24, and voice data 26 that is transferred to the end users 302. The CO 200 includes an OLT 202 connecting the optical access network to an IP, ATM, or SONET backbone, for example. Therefore, the OLT 202 device is the endpoint of a Passive Optical Network (PON) 18 and converts the electrical signals used by a service provider's equipment to fiber optic signals used by the PON 18. In addition, the OLT 202 coordinates multiplexing between the conversion devices at the user end 302. The OLT 202 sends the fiber optic signal through a feeder fiber 20, and the fiber optic signal is received by a remote node 120, which demultiplexes the fiber optic signal and distributes it to multiple users 302. Moreover, the CO 200 communicates with one or more GPS receivers 100a-n and receives the satellite signal 30 via the satellite receiver 100.

A multiplexer (MUX) combines several input signals and outputs a combined signal of the separate signals. The multiplexed signal is transmitted through a physical wire, which saves the cost of having multiple wires for each signal. As shown in FIG. 1B, the CO 200 multiplexes the signals received from several sources, such as video media distribution 22, internet data 24, and voice data 26, and multiplexes the received signals into one multiplexed signal before sending the multiplexed signal to the remote node 120 through the feeder fiber 20. The remote node 120 splits the signal received from the CO 200 and distributes the split signal to multiple Optical Network Units (ONUs) 300a-300n via fiber feeders 22a-22n. On the end user 302 side, a reverse process occurs using a demultiplexer (DEMUX) at each ONU 300. The demultiplexer receives the multiplexed signal and divides it into the separate original signals that were originally combined. The receiver end includes a number of network units/terminals (ONUs) 300, where each ONU services at least one user 302.

Figure 2A:
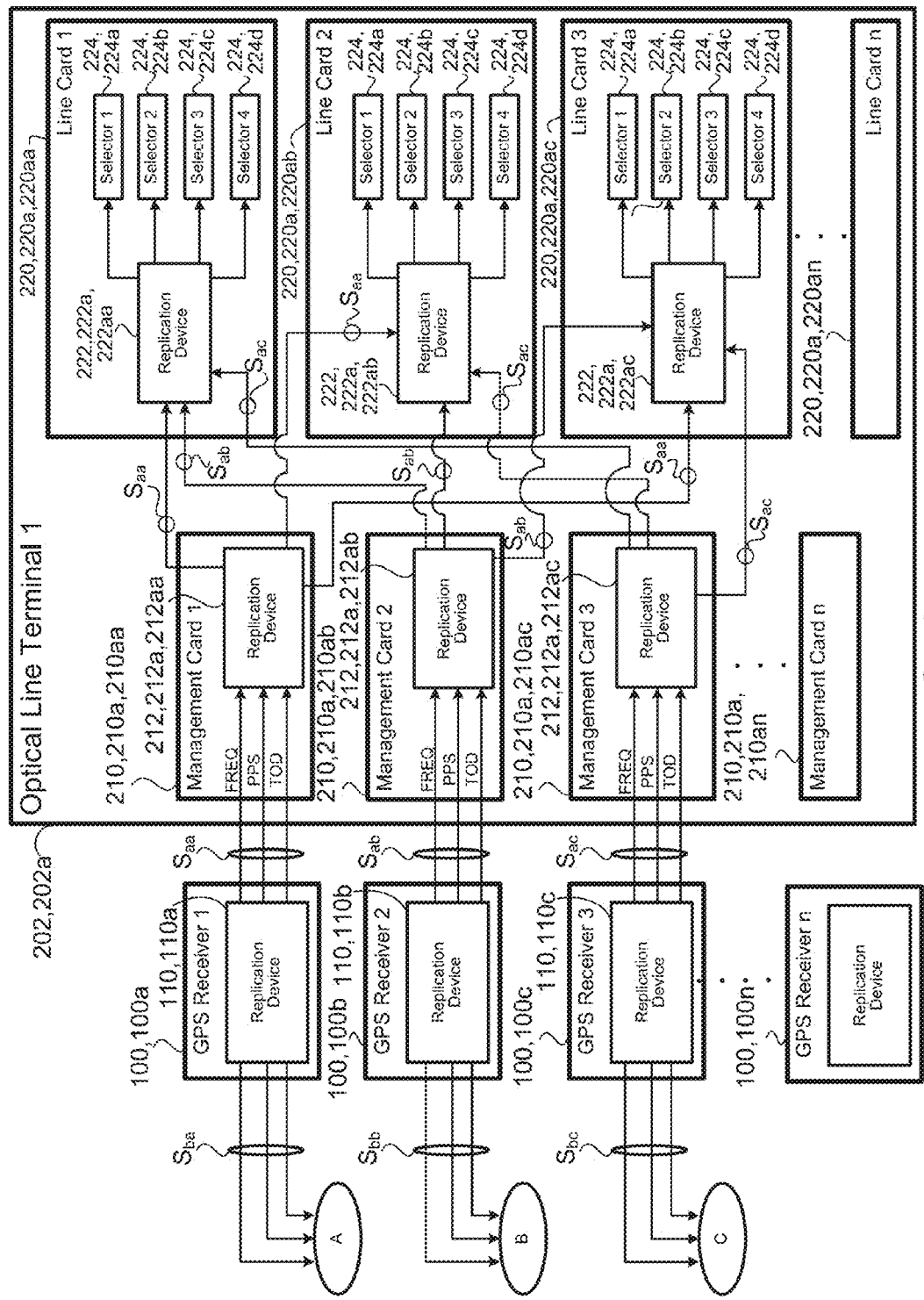
FIGS. 2A and 2B are schematic views of the multi-source global positioning satellite distribution framework of FIGS. 1A and 1B.
Figure 2B:
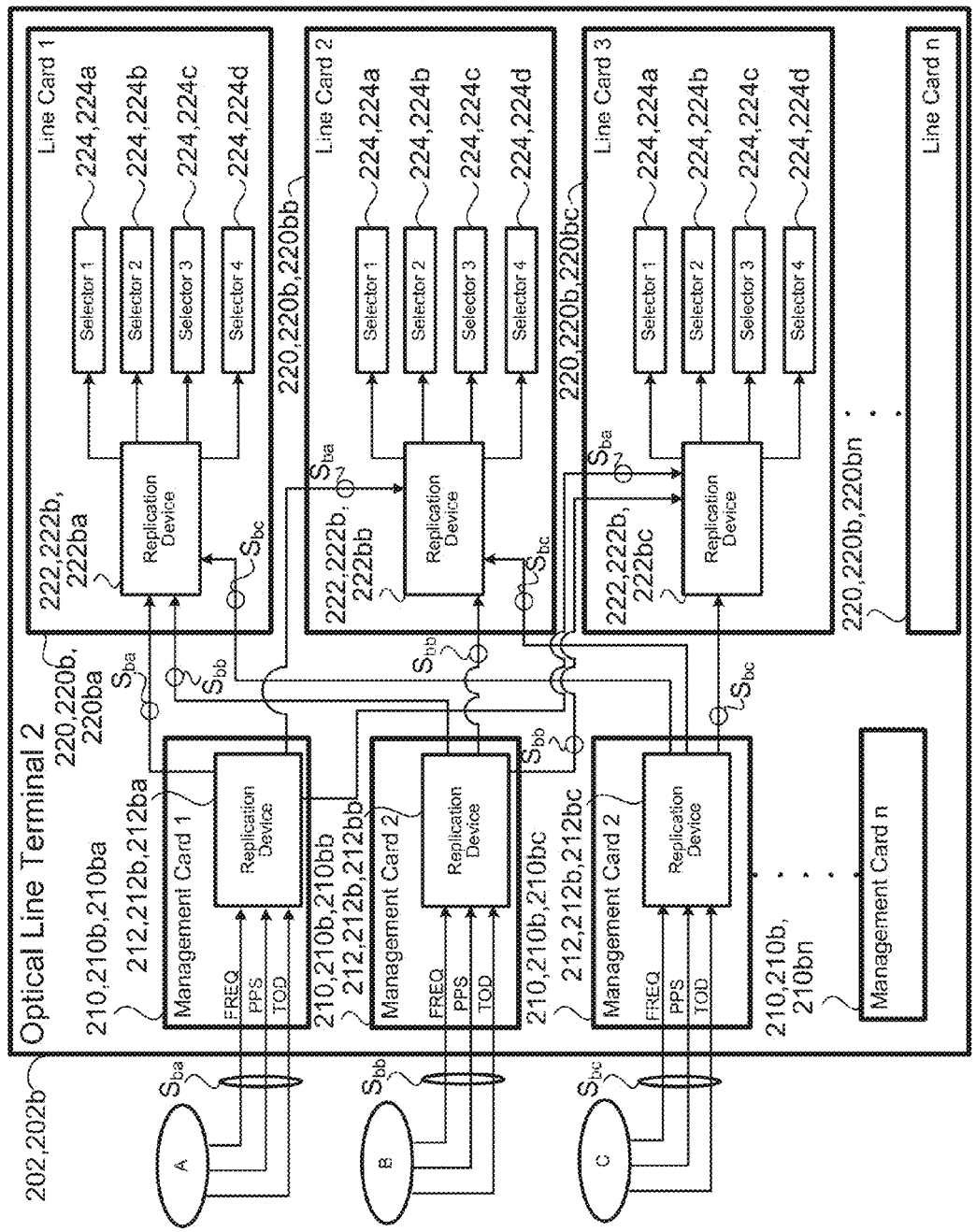

Each OLT 202 includes multiple MCs 210 and multiple LCs 220 to serve a very large number of residential (and non-residential) end users 302. The MC 210 allows the communication system 10 to monitor and manage the devices (e.g., OLT 202, ONU 300, remote node 120) of the communication system 10. A LC 220, also known as a digital LC, is a modular electronic circuit on a printed circuit board (PCB) that interfaces with telecommunications access networks and connects subscribers 302 to their service provider, i.e., OLT 202. Each GPS receiver 100 includes a replication component 110. Also, each management card 210 includes a replication component 212 (FIGS. 2A and 2B); and each LC 220 includes a replication component 222 and at least one selector 224 (such as a time system on a chip or a circuit) (FIGS. 2A and 2B). A system on a chip (SoC) 224 is an integrated circuit that includes components of a computer into a single chip. The selector 224 is configured to run a program; in this case, the selector 224 is a time SoC configured to determine the time based on the received signals (pulse-per-second (PPS) signal, time-of-day (TOD) signal, and frequency (FREQ) signal).

The communication network 10 may also include a management server 400 (system manager). The management server 400 executes on a data processing device 402 in communication with the GPS receivers 100 and the OLTs 202. The system manager 400 is configured to monitor the OLTs 202 (e.g., MCs 210, LC 220, selector 224, replication devices 212, 222, 110) to determine a presence of a failure within the communication network 10.

Referring to FIGS. 2A and 2B, a first OLT 202a and a second OLT 202b are each in communication with first, second and third satellite receivers 100a, 100b, 100c. Each GPS receiver 100, 100a-100n sends a signal to each of the MCs 210 of an OLT 202. If there are N number of MCs 210 in an OLT 202, there are be N GPS receivers 100 in the network 10. For example, as shown, the first OLT 202a includes three MCs 210aa, 210ab, 210ac and the second OLT 202b also includes three MCs 210ba, 210bb, 210bc. Each MC 210a, 210b of the first and second OLT 202a, 202b is in communication with the GPS receiver 100. For example, the first GPS receiver 100a is in communication with the first MC 210aa of the first OLT 202a; also the first GPS receiver 100a is in communication with the first MC 210ba of the second OLT 202b. The second GPS receiver 100b is in communication with the second MC 210ab of the first OLT 202a; also the second GPS receiver 100b is in communication with the second MC 210bb of the second OLT 202b. The third GPS receiver 100c is in communication with the third MC 210ac of the first OLT 202a; also the third GPS receiver 100c is in communication with the third MC 210bc of the second OLT 202b. Therefore, each MC 210 of an OLT 202 received a signal from a different GPS receiver 100.

To minimize the number of GPS receivers 100 within the communication network 10 and provide a unified quality of service, GPS signals 30 from each GPS receiver 100 are distributed to every MC 210 and subsequently to every LC 220 within each OLT 202. Moreover, each OLT 202 within the communication network 10 is accessible to time sources from multiple GPS receivers 100. Although this adds redundancy to the network 10, it protects the network 10 from failures and offers consistent and reliable service levels. For example, if one of the GPS receivers 100 that is sending a signal 30 to an OLT 202 fails, the OLT 202 can still determine an accurate time since it is receiving signals 30 from other GPS receivers 100. This network 10 architecture is an improvement over the previous systems, where a GPS receiver 100 fails to send a time signal to the OLTs 202, then the OLTs 202 fail to send a time to the end user 302. The communication network 10 allows the OLT 202 to determine which GPS receiver 100 has a highest quality and use that GPS receiver 100 as opposed to using a GPS receiver 100 that is undergoing a failure and is not providing accurate time.

Since each OLT 202 receives multiple signals from different GPS receivers 100, each OLT 202 includes a decision policy configured to select one of the GPS receivers 100 transmitting a signal 30 with the best signal integrity and precision and having a signal quality that meets a threshold. Several factors affect the quality of a GPS signal 30 transmitted from the GPS receiver 100 to OLTs 202 (i.e., MCs 210 and LCs 220 of the OLTs 202). Some of the factors that affect the quality of the GPS signal 30 include the difference in the quality of the GPS receivers 100, the degradation of the GPS signal 30 during its distribution over intermediate components of the OLT 202. Therefore, this cascaded distribution network 10, which includes multiple GPS receivers 100 and multiple OLTs 202, where each OLT 202 may be equipped with multiple MC's 210 and LCs 220, provides reliability (due to the multiple GPS signals 30 received by each OLT 202), while the hierarchical replication components provide network scalability (allowing the network 10 to increase with the increase in user demand).

The GPS signal 30 that the GPS receiver 100 sends to the OLT 202 includes a Pulse Per Second (PPS) signal, a time of day (TOD) signal, and a frequency (FREQ) signal. The PPS signal is an electrical signal that repeats once per second. A PPS signal has an accuracy going from a 12 picoseconds to a few microseconds per second (2.0 nanoseconds to a few milliseconds per day). The TOD signal represents the current time of day. The FREQ signal represents the frequency of the signals.

Each GPS receiver 100 includes a GPS replication device 110. The GPS replication device 110 of each GPS receiver 100 may be a part of the GPS receiver 100 or a standalone device 110, positioned adjacent to the GPS receiver 110. The GPS replication device 110 of the GPS receiver 100 replicates the GPS signal 30 (received from a satellite 14), which includes replicating the PPS signal, the TOD signal, and the FREQ signal. The GPS replication device 110 of the GPS receiver 100 replicates the GPS signal 30 into one or more replicated GPS signals 30, and each replicated signal 30 is transmitted to multiple OLTs 202 (e.g., MC's 210). If there are X number of OLTs 202, then each GPS receiver 100 makes X replicas $S_{nn}$ of the GPS signal 30. As shown, the replication component 110 of the GPS receiver 100 makes first and second replicas $S_{aa}$, $S_{ba}$, because there are two OLTs 202a, 202b. Similarly, the second GPS receiver 100b makes first and second replicas $S_{ab}$, $S_{bb}$, and the third GPS receiver 100c makes first and second replicas $S_{ac}$, $S_{bc}$.

Moreover, each MC 210 includes an MC replication device 212, which receives GPS replicated signals 30 having a PPS signal, a TOD signal, and a FREQ signal, and distributes the GPS replicated signal 30 to each LC 220 of the OLT 202. For example, the first MC 210aa, MC 210ba of the first OLT 202a, 202b receive a GPS replicated signal $S_{aa}$, $S_{ba}$ from the first GPS receiver 100a. The first MC 210aa, MC 210ba replicates the received GPS replicated signal $S_{aa}$, $S_{ba}$ and sends the replicated signal $S_{aa}$, $S_{ba}$ to first, second, and third LCs 220a, 220b of the OLT 202a, 202b. The second MC 220ab, MC 220bb replicates the received GPS replicated signal $S_{ab}$, $S_{bb}$ and sends the replicated signal $S_{ab}$, $S_{ba}$ to first, second, and third LCs 220a, 220b of the OLT 202a, 202b. The third MC 220ac, MC 210bc replicates the received GPS replicated signal $S_{ac}$, $S_{bc}$ and sends the replicated signal $S_{ac}$, $S_{bc}$ to first, second, and third LCs 220a, 220b of the OLT 202a, 202b. The MC replication device 212 makes equal replications as to the number of LCs 220 of the OLT 202, e.g., if the OLT 202 includes three LCs 220, then each MC replication device 212 makes three replicated signals $S_{aa}$, $S_{ab}$, $S_{ac}$, $S_{ba}$, $S_{bb}$, $S_{bc}$, (see FIGS. 2A, 2B) of the received GPS signal 30.

Each LC 220 includes an LC replication device 222. The LC replication device 222 receives GPS replicated signals 30 (including a PPS signal, a TOD signal, and a FREQ signal) from different collocated MCs 210, i.e., different GPS receivers 100. The LC replication device 222 selects and replicates one or more GPS signals (sets of PPS signals, TOD signals, and frequency signals) and sends them to different selectors 224.

Each LC 220 includes multiple selectors 224 implemented in parallel to support computation parallelization, which guarantees sufficient computation resources when the number of customers scale (i.e., increase or decrease). The selector 224 converts the GPS signals 30 to support IEEE-1588 PTP or SyncE. IEEE-1588 PTP is the protocol for synchronizing time and frequency clocks throughout the computer network; while SyncE is an International Telecommunication Union standard to delivery synchronous frequency information over the Ethernet. Each LC 220 (e.g., selector 224) receives the GPS signal 30 from each MC 210 of the OLT 202 and determines a signal quality score S of each signal 30 from a receiver 100 based on a signal drift and a phase precision of the corresponding signal 30. In addition, the LC 220 (e.g., selector 224) selects one of the received GPS signals 30 (Pulse Per Second (PPS) signal, a time of day (TOD) signal, and a frequency (FREQ) signal) having the highest quality score; i.e., the LC 220 (e.g., selector 224) determines the signal 30 having the highest quality score and uses the TOD signal of the corresponding signal 30 that has the highest signal quality score S. In some examples, each LC 220 includes a number of selectors 224 equal or greater than the number of GPS receivers 100.

In some implementations, the replication device 110, 212, 222 may be implemented by a fan-out buffer or by a field programmable gate array (FPGA). Other implementations of a replication device 110, 212, 222 are possible as well, such as any programmable or application specific device. A fan-out buffer is used as a building block in the clock tree, since it provides signal buffering in multiple low-skew copies of the input signal 30. An FPGA is an integrated circuit capable of being configured by the user after its manufacturing. In some examples, the replication device 110, 212, 222 replicates the received GPS signal 30 and simultaneously sends the replicated signals 30. In other examples, the replication device 110, 212, 222 receives a signal 30 and sends it to a first recipient, then the second and so forth. For example, the first MC 210 receives the GPS signal 30 and sends it iteratively to the first, second and third LC 220.

A user may specifically configure the FPGA to replicate the received signal 30. The replication devices 110, 212, 222 may cause jitter and part-to-part skews that may affect a phase and frequency precision of the GPS signals 30. Therefore, it is desirable to configure each OLT 202 to select the best received GPS signal 30. Moreover, hardware components may fail due to various reasons like aging, and overheating, or any other effects. Therefore, it is also beneficial and desirable to allow the communication network 10 to perform an online diagnostics method to locate the source of failures in real time, during mass deployment. The management server 400 oversees the diagnostics method.

In some examples, the OLT 202 receives the GPS signal 30 from the GPS receiver 100 at a receiver circuit, which may be part of the selector 224, or part of the replicators 110, 212, 222 or part of both. Each selector circuit 224 on an LC 220 may be exposed to multiple GPS signals 30, each having PPS/TOD/FREQ signals from different GPS receivers 100, aggregated at the LC replication device 222. For example, the LC replication device 222 of the first LC 220a receives GPS signals 30 from first, second, and third GPS receivers 100a, 100b, 100c received from the first, second, and third MCs 210a, 210b, 210c. Therefore, a policy or algorithm is used to decide the master GPS receiver 100 that carries the most accurate phase (PPS) and frequency information (FREQ). In addition, a selector 224 may be accessible to limited sets of GPS signals 30 at a time due to constrained availability of GPS input pins on the chip (discussed below with reference to FIG. 3). Therefore, it is desirable to have a GPS receiver selection algorithm, and a GPS selection communication protocol to reduce the input pin overhead on the same selector 224.

In some implementations, a selector 224 (selector circuit) can access N GPS receivers 100 (from N MCs 210). A GPS signal 30 may experience a frequency drift J, which is an unintended and arbitrary offset of the signal 30 from its nominal frequency. Frequency drift J may be due to aging of a component, changes in temperature of the component, or problems with a voltage regulator controlling a bias voltage of an oscillator. Therefore, a frequency drift of the GPS signals 30 may be due to the GPS signal receiver 100 and/or to the replication devices 110, 212, 222 during the cascaded distribution.

Consider $J_1^F, J_2^F, \ldots, J_N^F$ as the frequency drifts of the N frequency signals and $J_1^P, J_2^P, \ldots, J_N^P$ as the frequency drifts of the N PPS signals. The frequency drift value of a periodic signal may be measured at the selector 224, by using an external high-precision high-frequency oscillator (e.g., OCXO). The high-precision high-frequency oscillator ensures a precise frequency under demanding circumstances. The frequency drift value of the periodic signal (PPS) directly affects the stability of frequency information of the GPS receiver 100. A closed form function $g_J$ may be used to represent the combined impact of the frequency signal and the PPS signal. The combined result is J, as shown in the equation below:

$$J_i = g_J(J_i^F, J_i^P) \qquad (1)$$

Different GPS receivers 100 may also have a phase skew in their PPS signal. For example, the phase skew may equal 100 nanoseconds in the PPS signals. To determine the phase precision of the GPS receiver 100, consider $D_1^P, D_2^P, \ldots, D_N^P$ as an offline measurement of the propagation delay of the N PPS signals between the GPS receiver output and selector input. Also consider $D_1^R, D_2^R, \ldots, D_N^R$ to be the online measurement of the relative phase offset of the N PPS signals, as compared to a reference PPS signal. The reference PPS signal may be one of the N PPS signals or a test PPS signal generated at the selector 224 based on the high-precision high-frequency oscillator. In order to consider both the offline measurement of the propagation delay $D_i^F$ and the online measurement of the relative phase offset of the N PPS signals $D_i^R$, D is defined as:

$$D_i = D_i^P - D_i^R \qquad (2)$$

Assuming $D^m$ is the median value of $\{D_i\}$ and define a convergence of the phase accuracy of the PPS signal $\Delta D$ as:

$$\Delta D_i = |D_i - D^m| \qquad (3)$$

The signals 30 considered for the phase and frequency precision are the PPS signal and the frequency signal of the GPS receiver 100. The TOD signal does not affect phase and frequency precision, as long as each TOD packet arrives at the selector 224 within one second of the corresponding PPS pulse.

The overall quality score S of the GPS receivers 100 may be determined by taking into account both the frequency stability J and the phase accuracy AD. Therefore, the overall GPS signal quality may be represented by function $g_s$ by:

$$S_i = g_s(\Delta D_i, J_i) \qquad (4)$$

Based on the above algorithms, the selector 224 selects the GPS signal 30 with the best quality score S as the master source, i.e., the receiver 100 with the most accurate time. Therefore, after determining the signal quality score S of each received signal 30, the LC 220 associates a source identification with the determined signal quality score S and stores the signal quality score S and the associated source identification in non-transitory memory (not shown). The LC 220 selects the source identification associated with the received signal 30 having the highest signal quality score S.

In some implementations, and due to limited availability of GPS input pins on the selector 224, the LC replication device 222 may only select and send a subset of GPS clock sources to the selector 224 at a time. As previously described, the LC replication device 222 selects and replicates one or more GPS signals 30 and sends the replicated signals 30 to different selectors 224.

The selector 224 receives multiple GPS signals 30 from multiple GPS receivers 100. The selector 224 selects a primary GPS signal 30 from one GPS receiver 100 and iterates through each of the GPS signals $\{S_{aa}, S_{ab}, S_{ac}\}$ or $\{S_{ba}, S_{bb},$ $S_{bc}$} of the rest of the GPS receivers 100. For each iteration, the selector 224 requests and receives from the receiver circuit a primary signal 30 being a currently selected GPS signal {$S_{aa}, S_{ab}, S_{ac}$} or {$S_{ba}, S_{bb}, S_{bc}$} with the highest signal quality score S and the secondary signal 30 being the GPS signal 30 of the corresponding iterations. Since TOD does not affect the selection of the GPS receiver 100 (having the highest signal quality score S), the TOD signal from the secondary GPS receiver is not considered (also due to a limited number of pins, in some cases). Therefore, the selector 224 may spend several minutes on each secondary GPS source 100 and switch to the next source after timeout, by sending new request instructions to the LC replication device 222 (or other replication devices 110, 210). Once an iteration of all GPS sources is complete, the selector 224 performs the best GPS source selection algorithm and recalculates the best GPS source ID as the primary input. Thus, after the selector 224 completes its iteration process through all of the GPS signals {$S_{aa}, S_{ab}, S_{ac}$} or {$S_{ba}, S_{bb}, S_{bc}$}, the selector 224 determines the signal quality score of each of the received GPS signals {$S_{aa}, S_{ab}, S_{ac}$} or {$S_{ba}, S_{bb}, S_{bc}$} (as discussed above). The selector 224 requests and receives from the receiver circuit the source identification of the primary signal 30 and the source identification of the secondary signal 30. When the selector 224 receives the primary signal source identification and the received identification does not match a source identification of the currently selected GPS signal 30, then the selector 224 triggers an error.

Figure 3:
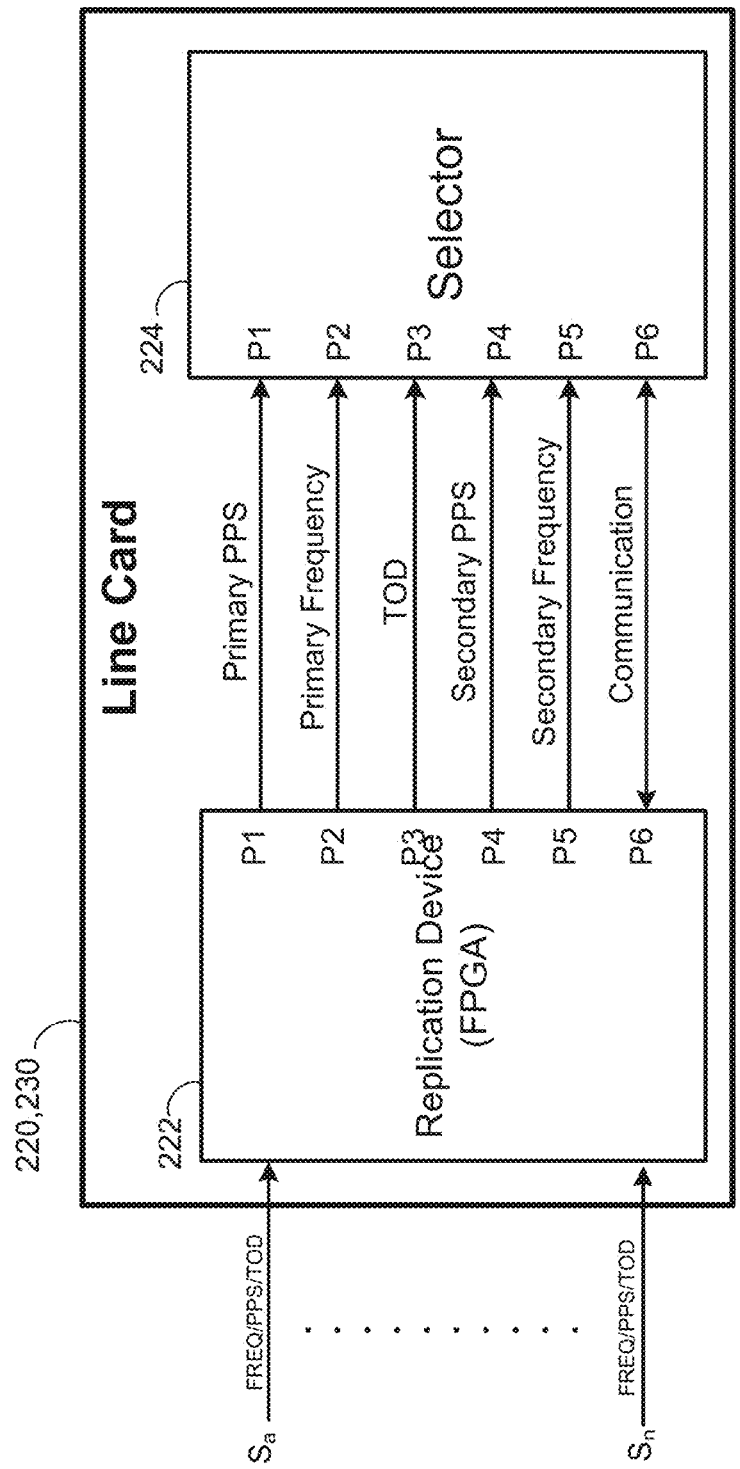
FIG. 3 is a schematic view an exemplary line card.

In some examples, an FPGA is used as the LC replication device 222. Referring to FIG. 3, the LC replication device 222 and the selector 224 may each need six pins to perform the bilateral communication protocol between the two devices. Other numbers of pins are also available. In some examples, the selector 224 is a time chip, a time system on a chip (time SoC), or a circuit. The time chip 224 receives a GPS signal and extracts the time and frequency information (TOD signal and FREQ signal), then converts the extracted signals to IEEE-1588 and SyncE packets. The FPGA 222 includes five GPS signal output pins (pins 1 through 5) and one GPIO (General Purpose Input Output) pins enabled. The pins are: Primary (Master) PPS signal (output pin) P1; Primary (Master) FREQ signal (output pin) P2; Primary TOD signal (output pin) P3; Secondary PPS signal (output pin) P4; Secondary Freq signal (output pin) P5; and FPGA and time chip communication (GPIO pin) P6. Moreover, the selector 224 includes five GPS signal input pins and one GPIO pin enabled. The selector pins include: Primary (Master) PPS signal (input pin) P1; Primary (Master) FREQ signal (input pin) P2; Primary TOD signal (input pin) P3; Secondary PPS signal (input pin) P4; Secondary FREQ signal (input pin) P5; and FPGA and time chip communication (GPIO pin) P6.

The communication channel between the FPGA and the time chip via pins P6 is realized by time division duplex of the GPIO pins (FIG. 3). Time-division duplexing (TDD) is the application of time-division multiplexing to separate outward and return signals. TDD emulates full duplex communication over a half-duplex communication link. TDD is advantageous in situations where there is a difference between the uplink and downlink data rates, since as the amount of uplink data is increasing, more communication capacity can be dynamically allocated, and as the traffic load becomes lighter, the capacity may be taken away. Similar analysis applies for downlink. Therefore, a receiver circuit 230 (which optionally includes the LC 220 and/or MCs 210) sets the PPS signals to be with 50% duty cycle.

Figure 4:
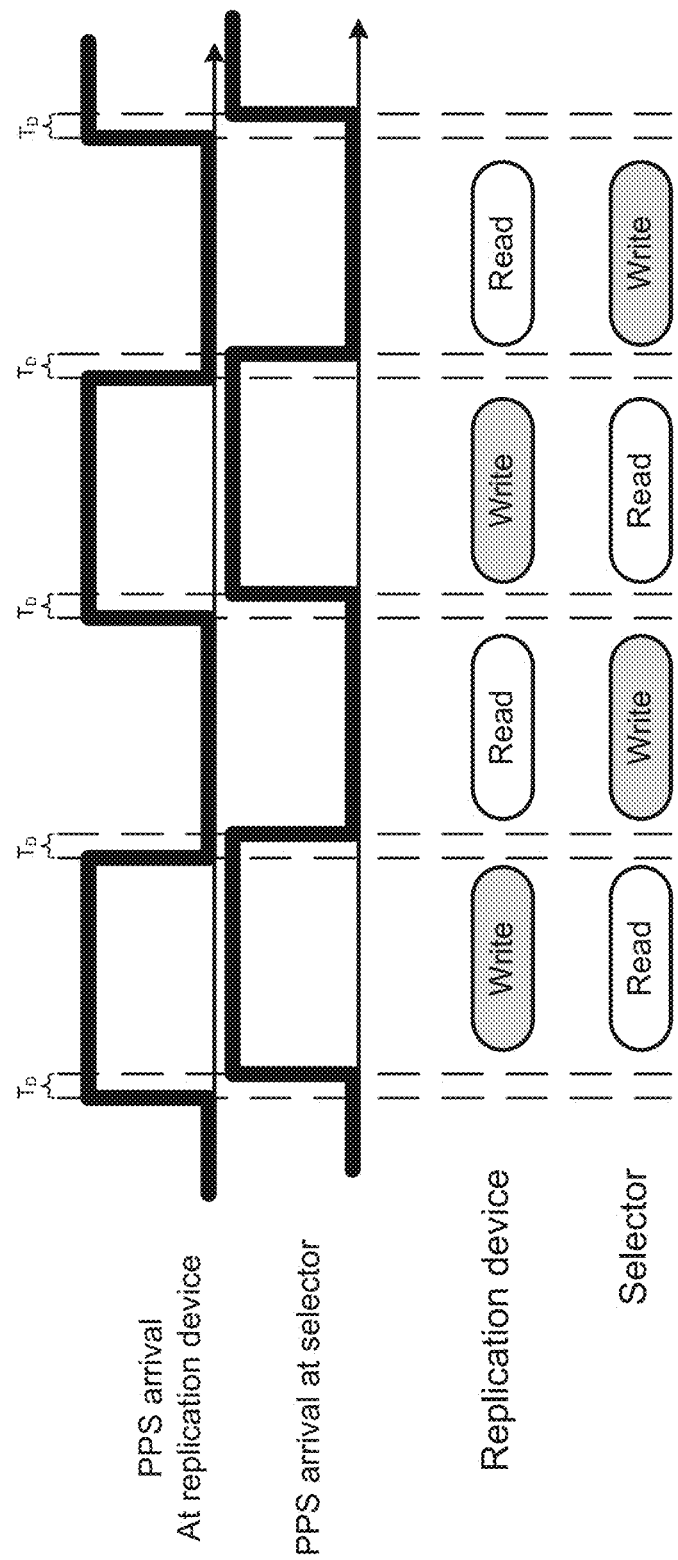
FIG. 4 is a schematic view of an exemplary read/write selection based on a received signal of the replication component and the selector of FIG. 3.

Referring to FIGS. 3 and 4, when the receiver circuit 230 (which optionally includes the LC 220 and/or MCs 210) detects a rising edge of the primary signal at pin P1 of the selector 224, the GPIO pin on the FPGA 222 is set to be an output pin, while the GPIO pin P6 on the Selector 224 is set to be an input. In some examples, the FPGA 222 waits a threshold time period before beginning communication signal transmission at its GPIO output pin P6. The threshold time period allows for sufficient time for the selector 224 to switch its GPIO pin P6 from an input pin to an output pin before the transmission starts.

However, when the receiver circuit 230 detects the arrival of a falling edge of the primary PPS signal, the GPIO pin P6 on the FPGA 222 is set to be an input pin, while GPIO pin P6 on the selector 224 is set to be an output. The selector 224 can start transmitting communication signals immediately once the selector GPIO pin flips P6.

When the sixth pin P6 of the FPGA 222 is an output pin, then the signal from FPGA 222 sent via the communication channel carries the current primary (and optionally the secondary) GPS source identification. However, when the sixth pin P6 of the selector 224 is an output pin, then the signal from the time selector 224, via the communication channel, carries the requested primary GPS source identification and the requested secondary GPS source identification.

Figure 5:
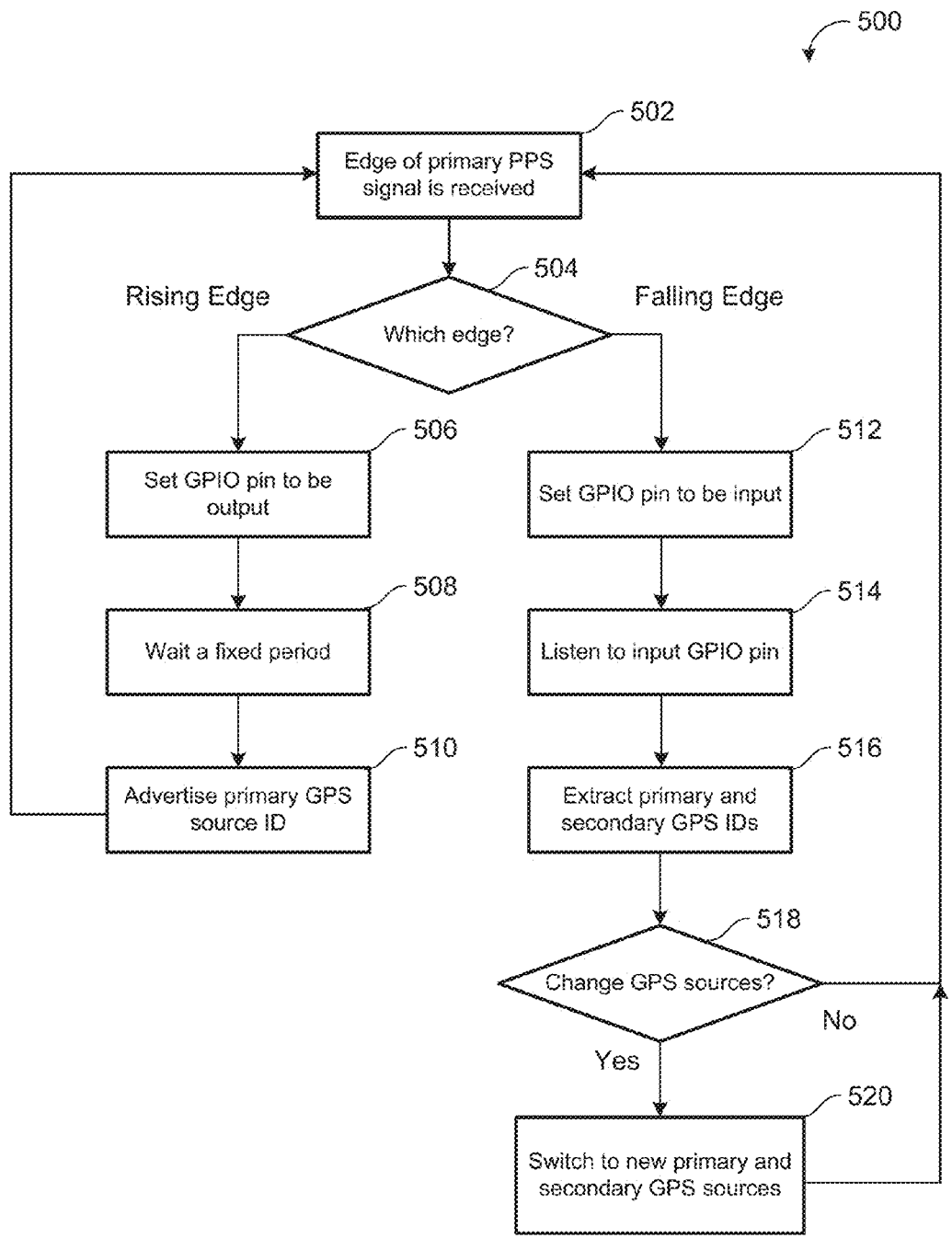
FIG. 5 is a schematic view of an exemplary arrangement of operations for determining a state of a replication device.

FIG. 5 illustrates a method 500 of determining the state of the FPGA 222 (replication device). At block 502, the edge of the primary PPS signal is received. At decision block 504, the receiver circuit 230 determines if the received edge is a rising edge or a falling edge. If the receiver circuit 230 determines that the received edge is a rising edge, then at block 506, the receiver circuit 230 sets GPIO P6 of the FPGA 222 to an output pin, then the receiver circuit 230 waits a threshold period at block 508 before determining and advertising, at block 510, the primary and optionally the secondary GPS source ID. Referring back to decision block 504, if the receiver circuit 230 determines that the received edge is a falling edge, then at block 512 the receiver circuit 230 sets the GPIO pin P6 of the FPGA 222 to be an input pin, and then listens to the input GPIO pin P6 at block 514, before extracting the primary and secondary GPS identifications at block 516. At decision block 518, the receiver circuit 230 determines if the OLT should change the GPS source (based on the signal analysis above). If the receiver circuit 230 determines that the GPS source should be changed, then at block 520, the receiver circuit 230 switches the GPS receiver 100 being used as the source for the GPS signal and has a new primary source and a new secondary source, at block 520.

The selector 224 receives multiple GPS signals 30 from multiple GPS receivers 100. The selector 224 selects a primary GPS signal 30 from one GPS receiver 100 and iterates and accesses different GPS receivers 100 via the secondary PPS signal and the secondary frequency. Since TOD does not affect the selection of the GPS receiver 100, the TOD signal from the secondary GPS receiver 100 is not considered (also due to a limited number of pins, in some cases). Therefore, the selector 224 may spend several minutes on each secondary GPS source 100, and switch to the next source after timeout, by sending new request instructions to the FPGA 222. Once an iteration of all GPS sources is complete, the selector 224 performs the best GPS source selection algorithm, and recalculates the best GPS source ID as the primary input.

Figure 6:
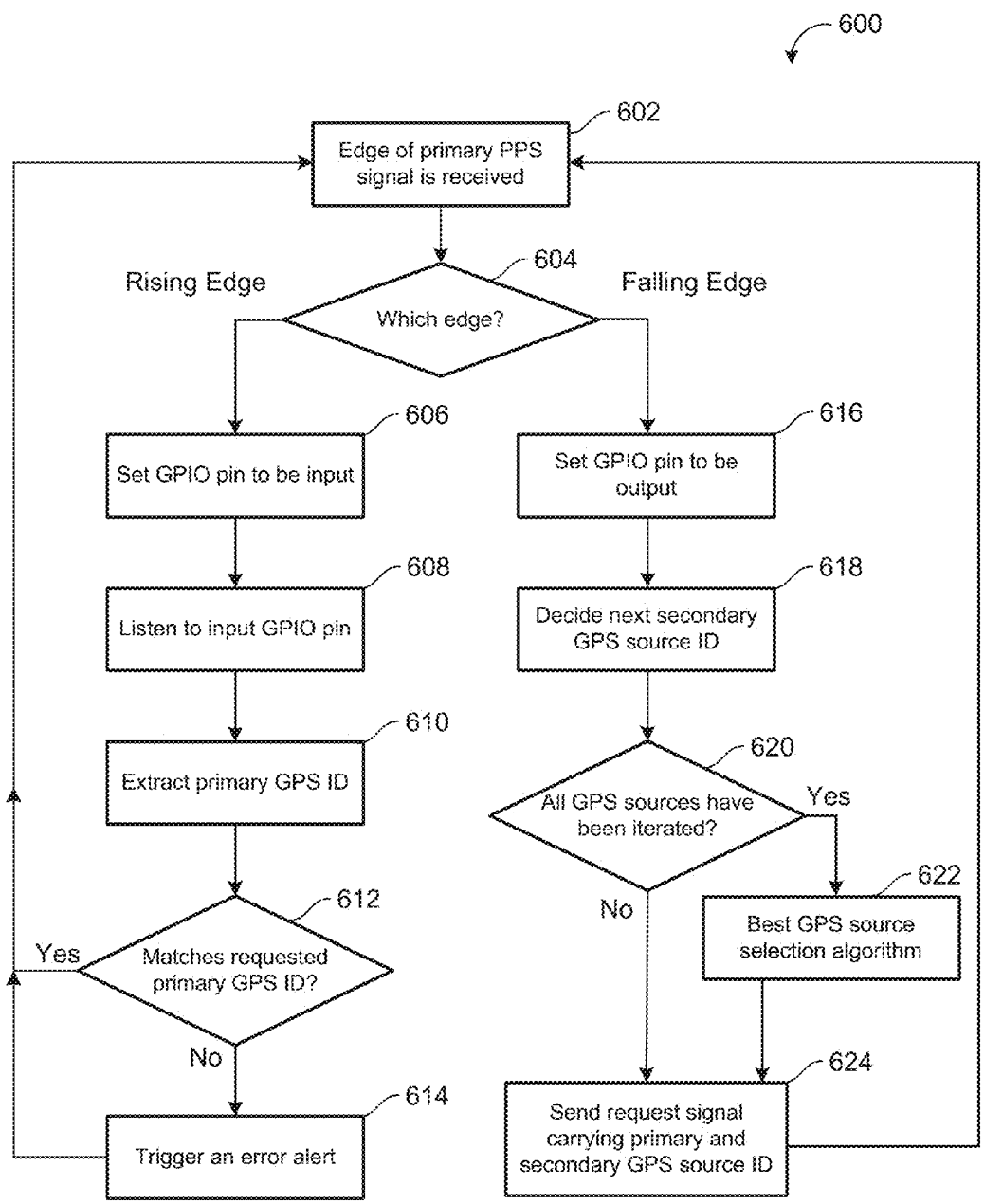
FIG. 6 is a schematic view of an exemplary arrangement of operations for determining a state of a selector.

FIG. 6 illustrates a method 600 of determining the state of the selector 224. At block 602, the selector 224 receives the edge of the primary PPS signal. The receiver circuit 230 determines at decision block 604 if the edge is a rising edge or a falling edge. If the receiver circuit 230 determines that the edge is a rising edge, then at block 606 the receiver circuit 230 sets the GPIO pin P6 of the selector 224 to be an input pin, then at block 608 listens to input from the input GPIO pin P6. At block 610, the selector 224 extracts the primary GPS identification ID. At decision block 612, the selector 224 determines if the primary GPS ID from block 610 matches a requested primary GPS ID, and if yes, the selector 224 goes to block 602. If the primary GPS ID from block 610 does not match the requested primary GPS ID, then the selector 224 triggers an error alert at block 614 and sends the alert to a remote management server 400 before going back to block 602.

Referring back to block 604, if the received primary PPS signal is a falling signal, then the selector 224 sets the GPIO pin P6 to an output pin at block 616, and decides, at block 618, which GPS source is the next secondary GPS source ID. At block 620, the selector 224 determines if all GPS sources have been iterated, if so, then at block 622 the best GPS source selection is determined using the selection algorithms described above. However, if not all the GP sources have been iterated, then at block 624, the selector 224 sends instruction signals via the GPIO pin P6 to the LC replication device 222 so that the LC replication device 222 sends the primary and second GPS source IDs.

In some implementations, when the OLT 202 detects that the quality of a GPS signal 30 is less than a threshold quality or is worse than the other received GPS signals 30 (received from other GPS receivers 100), the OLT 202 triggers an alert to a remote management server 400, which executes autonomous diagnostics on a data processing device 402 to localize the failed component(s) that is causing the reduced quality of the GPS signal 30. Such diagnosis may be autonomous and in real time.

The communication network 10 is configured to perform online diagnostics to locate a failure of a GPS receiver 100 of the cascaded multi-source GPS distributed hierarchy. A GPS clock source may fail at a selector 224 when its frequency drift J or its ΔD measured at the selector 224 is worse than a threshold (e.g., below or above the threshold).

Each selector 224 reports the failure condition to a remote central server in real time. The central server gathers all failure conditions from all OLTs 202, performs diagnostics, and finds the failure location (i.e., GPS receiver 100, replication devices 110, 212, 222, or selector 224 undergoing a failure) in real time.

The online diagnostics process finds a lowest common ancestor (LCA) of the hardware components (i.e., GPS receiver 100, replication devices 110, 212, 222, or selector 224). The LCA is the unique node of greatest depth that is an ancestor of every node in a nonempty set of notes in a rooted tree.

Referring back to FIGS. 2A and 2B, the cascaded GPS distribution framework establishes a GPS distribution multi-root forest, where each GPS receiver 100 including its replication devices (i.e., GPS replication device 110) is a root node, each selector 224 is a leaf node, and each replication in the OLT 202 (i.e., MC replication device 212 and LC replication device 222) is an intermediate node of the forest.

In some examples, based on FIGS. 2A and 2B, all the GPS clock sources fail at the first selector 224a of the first LC 220aa of the first OLT 202a, while the phase and frequency measurement returns good results at the other selectors 224b, 224c, 224d of the first LC 220aa of the first OLT 202a. The LCA node is the leaf node (failure node or location), which is the first selector 224a of the first LC 220aa of the first OLT 202a.

Also considering FIGS. 2A and 2B, in some examples, all the GPS clock sources fail at the selectors 224a, 224b, 224c, 224d of the first LC 220aa of the first OLT 202a, while the phase and frequency measurements return good results at other LCs 220b, 220c of the first OLT 202a. The LCA node (failure node or location) is the intermediate node, which is the LC replication device 222aa of the first LC 220aa of the first OLT 202a.

In another example, if the first GPS source 100a fails at all the selectors 224 on all LCs 220a of the first OLT 202a, while phase and frequency measurement of the first GPS source 100a returns good results on other OLT 202b-202n, then the LCA node (the failure location or node) is the intermediate node, which is the MC replication device 212aa of the first MC 210aa on the first OLT 202a. In yet another example, if the first GPS source 100a fails at all the selectors 224 across all OLTs 202, while phase and frequency measurement of other GPS sources 100b, 100c (e.g., GPS source 2, GPS source 3, . . . ) returns good results, then the LCA node, or in other words, the failure location, is the root node, which is either the first GPS receiver 100a, or its GPS replication component 110a.

In some examples, more than one hardware component fails (100, 110, 210, 212, 220, 222, 224) at the same time. To identify more than one LCA, the system 10 uses a Breadth First Search (BFS) based algorithm. The manager server 400 first searches each root node (i.e., the GPS receivers 100 and their corresponding replication components 110), and check whether a root node is a LCA node. If a node is a LCA, then the manager server 400 adds it to the failure location set. Once the manager server 400 searches the root nodes, the manager server 400 searches the MCs 210 and their respective replication devices 212.

The following pseudocode provides an exemplary online diagnostics algorithm that runs on the management server 400:

```
function dia (R) // Input is the failure report
set R, received at the central server
F = {};              //Set F is initialized as an empty set
l = l;               // l is the layer index
while (1)
   if(l exceeds MAX layer number)
      break;
   end if
   for each {node} in {layer l}
      if (node is a LCA based on R)
         F = F + node;
      end if
   end for
   l = l + 1;        // Layer index increases -> move
                     to next layer end while.
```

Figure 7:
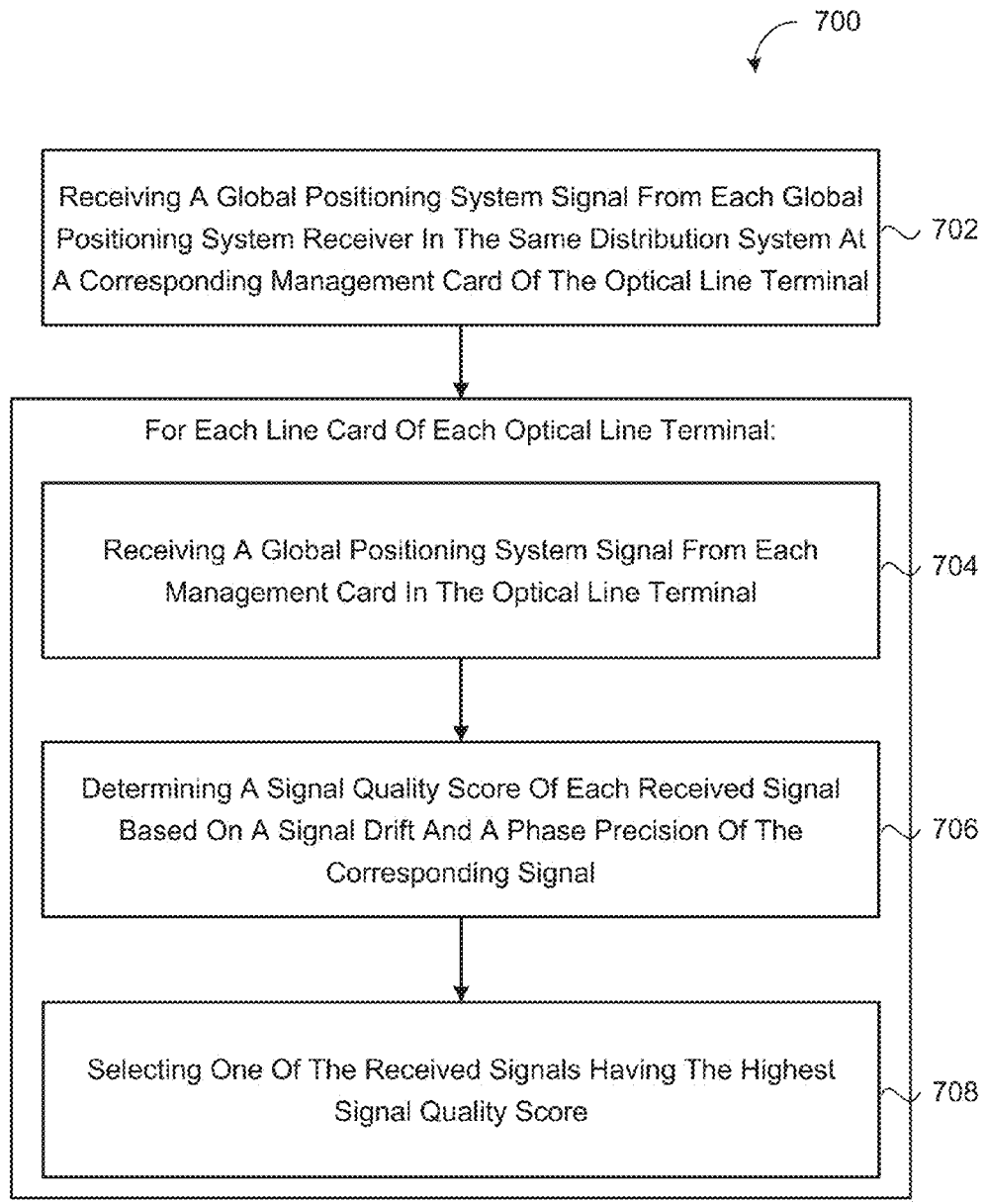
FIG. 7 is a schematic view of an exemplary arrangement of operations for determining a signal quality score.

Referring to FIG. 7, in some implementations, a method 700 includes, for each OLT 202 in a signal distribution system 10 (communication network), receiving 702 a GPS signal 30 from each GPS receiver 100 in the signal distribution system 12 at a corresponding MC 210 of the OLT 202. Moreover, the method 700 includes, for each LC 220 of each OLT, receiving 704 a GPS signal 30 from each MC 210 in the OLT 202, determining 706 a signal quality score S of each received signal 30 based on a signal drift J and a phase precision D of the corresponding signal 30, and selecting 708 one of the received GPS signals 30 having the highest signal quality score S, and utilizing the TOD signal of the highest signal 30 having the highest signal quality score S.

In some implementations, the method 700 includes receiving a GPS signal 30 from its corresponding GPS satellite 14 at each GPS receiver 100 and replicating the received GPS signal 30 for communication to the corresponding MC 210 in each OLT 202. The method 700 also includes receiving a GPS signal 30 at each MC 210 from its corresponding GPS receiver 100 and replicating the received GPS signal 30 for communication to each LC 220 in the OLT 202. Additionally, the method 700 includes receiving GPS signals 30 at each LC 220 from each of the MCs 210 of the OLT 202 and replicating the received GPS signals 30. In some examples, the method 700 includes replicating the GPS signal 30 using a field programmable gate array, a fan-out buffer, or any programmable or application specific device.

In some implementations, the method 700 includes receiving, at multiple selectors 224 in each LC 220, a GPS signal 30 from each MC 210 in the corresponding OLT 202, and determining a signal quality score S of each received signal 30 based on a signal drift J and a phase precision D of the corresponding signal 30. The method 700 also includes selecting one of the received GPS signals 30 having the highest signal quality score S. In some examples, each LC 220 includes at least as many selectors 224 as GPS receivers 100 in the signal distribution system 12.

In some implementations, the method 700 further includes associating each GPS signal 30 with a source identification that identifies a GPS satellite 14 sending the GPS signal 30. After determining the signal quality score S of each received signal 30, the LC 220 may associate a source identification with the determined signal quality score S and store the signal quality score S and the associated source identification in non-transitory memory and select the source identification associated with the received signal 30 having the highest signal quality score S.

Figure 8:
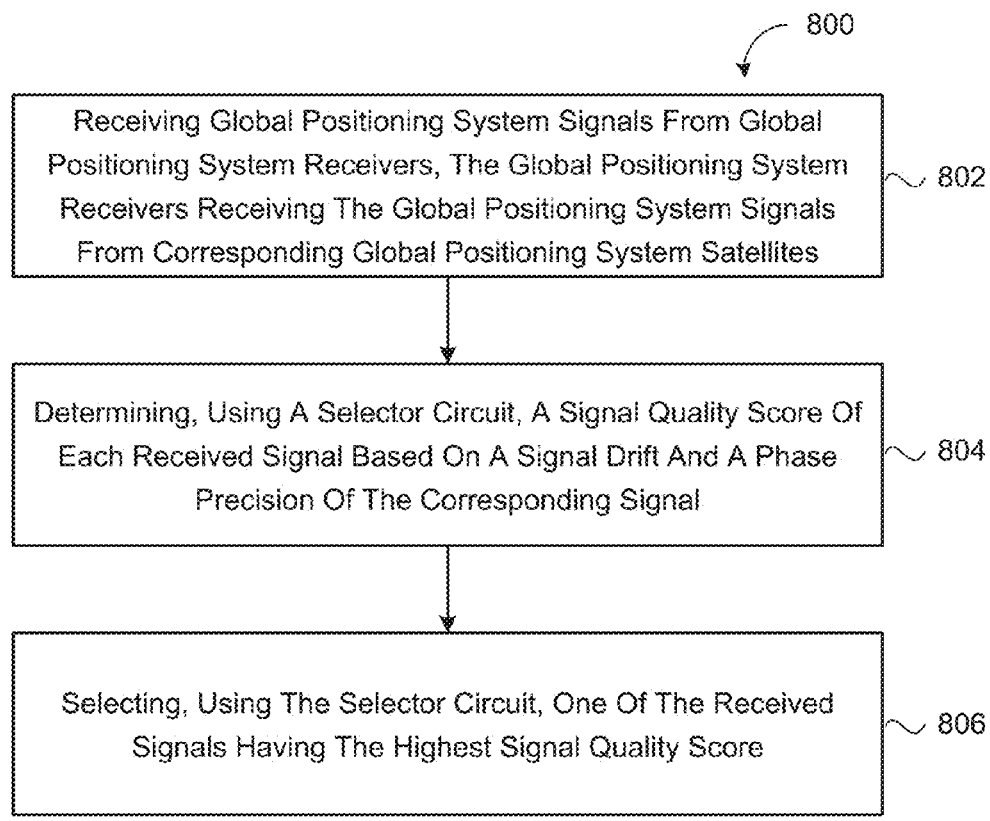
FIG. 8 is a schematic view of an exemplary arrangement of operations for selecting a signal from multiple signals received from a global positioning system receiver.

Referring to FIG. 8, in some implementations, a method 800 includes receiving 802 GPS signals 30 from GPS receivers 100. The GPS receivers 100 receive the GPS signals 30 from corresponding GPS satellites 14. The method 800 also includes determining 804, using a selector circuit 202 (which may optionally include one or more of MCs 210, LCs 220, selectors 224, or replication devices 212, 222), a signal quality score S of each received signal 30 based on a signal drift J and a phase precision D of the corresponding signal 30, and selecting 806, using the selector circuit 202, one of the received GPS signals 30 having the highest signal quality score S.

In some implementations, after determining the signal quality score S of each received signal 30, the method 800 further includes associating a source identification with the determined signal quality score S. The source identification identifies a GPS satellite 14 that sends the GPS signal 30. The method 800 also includes storing the signal quality score S and the associated source identification in non-transitory memory, and selecting the source identification associated with the received GPS signal 30 having the highest signal score.

In some implementations, the method 800 further includes iterating through each of the GPS signals 30 from GPS receivers 100, and for each iteration receiving a primary signal 30 including a currently selected GPS signal 30 having the highest signal quality score S and a secondary signal 30 including the GPS signal 30 of the corresponding iteration. In addition, after iterating through all of the GPS signals 30 from GPS receivers 100, the method 800 includes: determining the signal quality score S of each received signal 30 based on a signal drift J and a phase precision D of the corresponding signal 30; and selecting the GPS signal 30 having the highest signal quality score S as the primary signal 30. In some examples, at each iteration, the method 800 also includes receiving a source identification of the primary signal 30 and a source identification of the secondary signal 30. Additionally, when the received primary signal source identification does not match a source identification of the currently selected GPS signal 30, the method 800 includes triggering an error.

In some implementations, when receiving a rising edge of a pulse per second signal component of the GPS signal 30, the method 800 includes: setting a bi-directional pin to an input pin; and receiving the primary and optionally the secondary signal source identification. Moreover, when receiving a falling edge of the pulse per second signal component of the GPS signal 30, the method 800 includes setting the bi-directional pin to an output pin and outputting the primary signal source identification and the secondary signal source identification. In some examples, when receiving a rising edge of the pulse per second signal component of the GPS signal 30, the method 800 includes comparing the received primary signal source identification with the primary signal source identification outputted after the previous falling edge of the pulse per second signal component and triggering an error when the primary signal source identifications do not match.

In some examples, the method 800 includes receiving, at a replicator, the GPS signals 30 from the GPS receivers 100. The replicator replicates the GPS signals 30. The method 800 also includes receiving the GPS signals 30 at multiple selectors 224 in communication with the replicator. Each selector 224 receives from the replicator a GPS signal 30 from each GPS receiver 100 determines a signal quality score S of each received signal 30 based on a signal drift J and a phase precision D of the corresponding signal 30 and selects one of the received GPS signals 30 having the highest signal quality score S.

Figure 9:
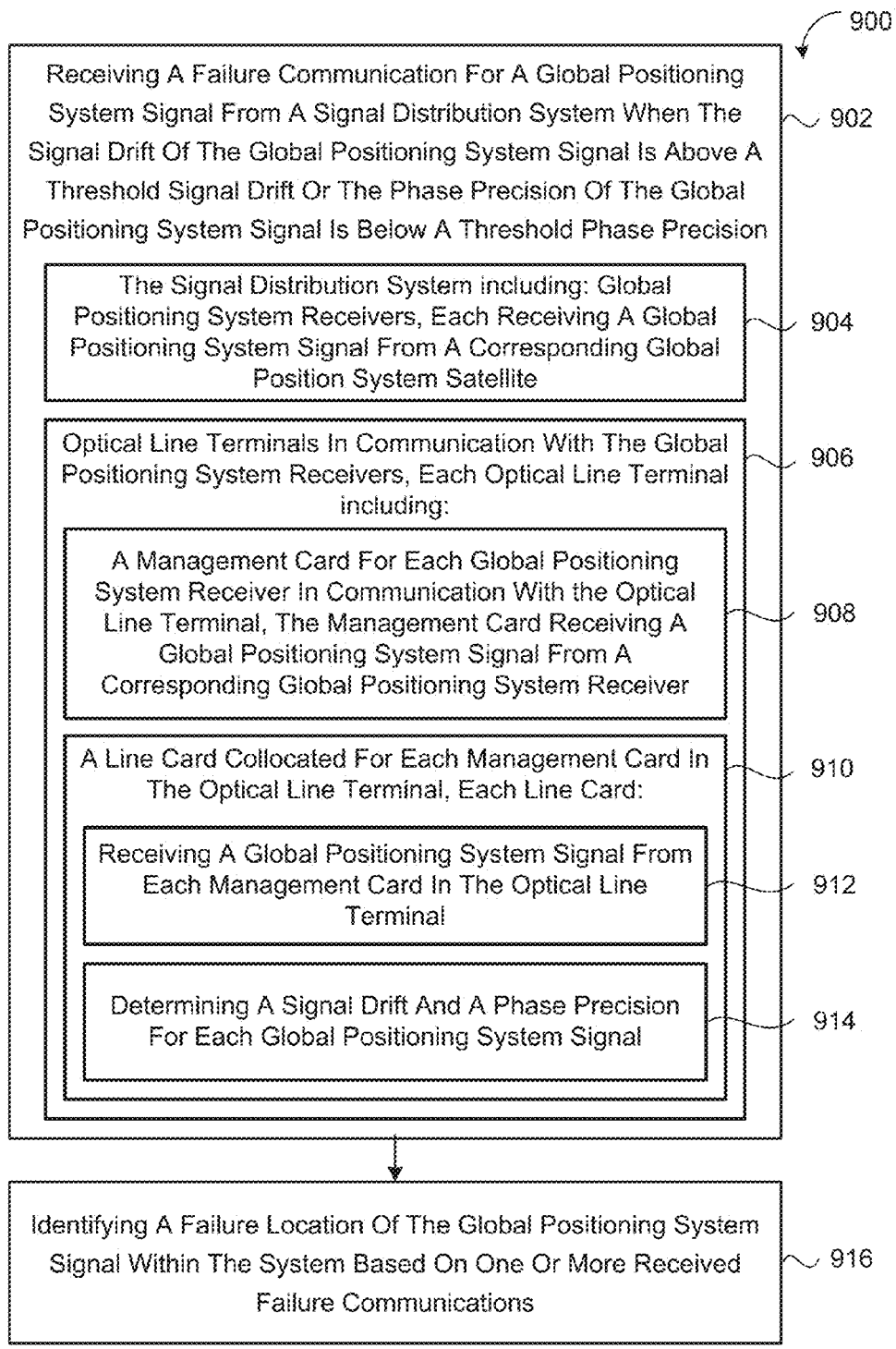
FIG. 9 is a schematic view of an exemplary arrangement of operations for a diagnostic method for locating signal distribution failures.

Referring to FIG. 9, in some implementations, a method 900 includes receiving 902 a failure communication for a GPS signal 30 from a signal distribution system 12 when the signal drift J of the GPS signal 30 is above a threshold signal drift J or the phase precision D of the GPS signal 30 is below a threshold phase precision D. The signal distribution system 12 includes 904 GPS receivers 100 and OLTs 202. Each GPS receiver 100 receives a GPS signal 30 from a corresponding GPS satellite 14. The OLTs 202 are communicating 906 with the GPS receivers 100. Each OLT 202 includes multiple MCs 210 and multiple LCs 220 collocated 910 for MCs 210 in the OLT 202. The MC 210 for each GPS receiver 100 is in communication with the OLT 202. The MC 210 receives 908 a GPS signal 30 from a corresponding GPS receiver 100. Each LC receives 912 a GPS signal 30 from each MC 210 in the OLT 202 and determines 914 a signal drift J and a phase precision D for each GPS signal 30. The method 900 also includes identifying a failure location of the GPS signal 30 within the system based on one or more received failure communications.

In some implementations, the method 900 includes identifying a LC 220 as a failure location when the LC 220 identifies a failure of a GPS signal 30 while other LCs 220 of the same OLT 202 do not identify a failure of the GPS signal 30. Additionally or alternatively, the method 900 may include identifying a MC 210 of an OLT 202 as a failure location when every LC 220 of that OLT 202 identifies a failure of a GPS signal 30 while other LCs 220 of other OLTs 202 do not identify a failure of that GPS signal 30. The method 900 may include identifying a GPS receiver 100 as a failure location when the LCs 220 of every OLT 202 identifies a failure of a GPS signal 30 while at least some of the LCs 220 of the OLTs 202 do not identify a failure of a GPS signal 30 from another GPS receiver 100.

In some implementations, the GPS receivers 100, the MCs 210, and the LCs 220 each include a replicator. The replicator of each GPS receiver 100 receives a GPS signal 30 from its corresponding GPS satellite 14 and replicates the received GPS signal 30 for communication to the corresponding MC 210 in each OLT 202. The replicator of each MC 210 receives a GPS signal 30 from its corresponding GPS receiver 100 and replicates the received GPS signal 30 for communication to each LC 220 in the OLT 202. The replicator of each LC 220 receives GPS signals 30 from each of the MCs 210 of the OLT 202 and replicates the received GPS signals 30. Each LC 220 includes multiple analyzer circuits 224, each receiving the replicated GPS signals 30 from the replicator 222 of the LC 220. Moreover, each analyzer circuit 224 (e.g., selector) may determine the signal drift J and the phase precision D for each GPS signal 30, compare the signal drift J of each GPS signal 30 with the threshold signal drift J, compare the phase precision D of each GPS signal 30 with the threshold phase precision D, and determine a failure of the GPS signal 30 when the signal drift J of the GPS signal 30 is above the threshold signal drift J or the phase precision D of the GPS signal 30 is below the threshold phase precision D. The method 900 may further include identifying an analyzer circuit 224 as a failure location when that analyzer circuit 224 identifies a failure of a GPS signal 30 while other analyzer circuits 224 do not identify a failure of that GPS signal 30.

The method 900 may include identifying the replicator 222 of a LC 220 as a failure location when the analyzer circuits 224 of that LC 220 each identify a failure of a GPS signal 30 while other analyzer circuits 224 of other LCs 220 of the same OLT 202 do not identify a failure of that GPS signal 30. Additionally or alternatively, the method 900 may include identifying the replicator 212 of an MC 210 of an OLT 202 as a failure location when the analyzer circuits 224 of every LC 220 of that OLT 202 identifies a failure of a GPS signal 30 while other analyzer circuits 224 of other OLTs 202 do not identify a failure of that GPS signal 30. Furthermore, additionally or alternatively, the method 900 may include identifying the replicator 110 of a GPS receiver 100 as a failure location when the analyzer circuits 224 of every OLT 202 identifies a failure of a GPS signal 30 while at least some of the analyzer circuits 224 of the OLTs 202 do not identify a failure of a GPS signal 30 from another GPS receiver 100.

Figure 10:
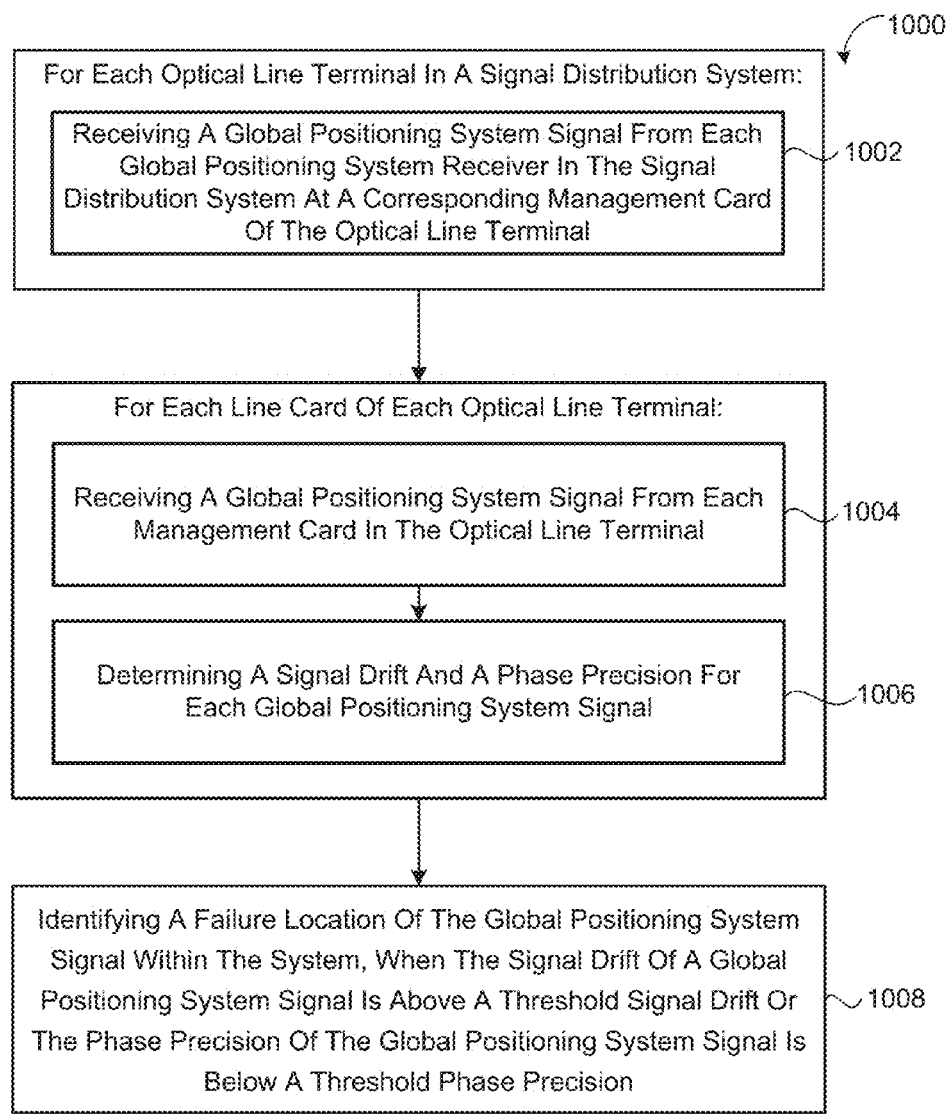
FIG. 10 is a schematic view of an exemplary arrangement of operations for a diagnostic method for locating signal distribution failures.

Referring to FIG. 10, in some implementations, a method 1000 includes, for each OLT 202 in a signal distribution system 12, receiving 1002 a GPS signal 30 from each GPS receiver 100 in the signal distribution system 12 at a corresponding MC 210 of the OLT 202. The method 1000 also includes, for each LC 220 of each OLT 202, receiving 1004 a GPS signal 30 from each MC 210 in the OLT 202 and determining 1006 a signal drift J and a phase precision D for each GPS signal 30. When the signal drift J of a GPS signal 30 is above a threshold signal drift J or the phase precision D of the GPS signal 30 is below a threshold phase precision D, the method 1000 includes identifying 1008 a failure location of the GPS signal 30 within the system.

In some implementations, the method 1000 further includes identifying a LC 220 as a failure location when the LC 220 identifies a failure of a GPS signal 30 while other LCs 220 of the same OLT 202 do not identify a failure of the GPS signal 30, identifying a MC 210 of an OLT 202 as a failure location when every LC 220 of that OLT 202 identifies a failure of a GPS signal 30 while other LCs 220 of other OLTs 202 do not identify a failure of that GPS signal 30, and identifying a GPS receiver 100 as a failure location when the LCs 220 of every OLT 202 identifies a failure of a GPS signal 30 while at least some of the LCs 220 of the OLTs 202 do not identify a failure of a GPS signal 30 from another GPS receiver 100.

A number of implementations have been described. Nevertheless, it will be understood that various modifications may be made without departing from the spirit and scope of the disclosure. Accordingly, other implementations are within the scope of the following claims.

What is claimed is:

1. A signal distribution system comprising:
    global positioning system receivers, each receiving a global positioning system signal from a corresponding global positioning system satellite;
    optical line terminals in communication with the global positioning system receivers, each optical line terminal comprising:
        a management card for each global positioning system receiver in communication with the optical line terminal, the management card receiving a global positioning system signal from a corresponding global positioning system receiver; and
        a line card collocated for each management card in the optical line terminal, each line card:
            receiving a global positioning system signal from each management card in the optical line terminal; and
            determining a signal drift and a phase precision for each global positioning system signal; and
    a system manager executing on a data processing device in communication with the global positioning system receivers and the optical line terminals, the system manager:
        receiving a failure communication for a global positioning system signal from a line card when the signal drift of the global positioning system signal is above a threshold signal drift or the phase precision of the global positioning system signal is below a threshold phase precision; and
        identifying a failure location of the global positioning system signal within the system based on one or more received failure communications.

2. The system of claim 1, wherein the system manager identifies a management card of an optical line terminal as a failure location when every line card of that optical line terminal identifies a failure of a global positioning system signal while other line cards of other optical line terminals do not identify a failure of that global positioning system signal.

3. The system of claim 1, wherein the system manager identifies a global positioning system receiver as a failure location when the line cards of every optical line terminal identifies a failure of a global positioning system signal while at least some of the line cards of the optical line terminals do not identify a failure of a global positioning system signal from another global positioning system receiver.

4. The system of claim 1, wherein the global positioning system receivers, the management cards, and the line cards each comprise a replicator, wherein:
    the replicator of each global positioning system receiver receives a global positioning system signal from its corresponding global positioning system satellite and replicates the received global positioning system signal for communication to the corresponding management card in each optical line terminal;
    the replicator of each management card receives a global positioning system signal from its corresponding global positioning system receiver and replicates the received global positioning system signal for communication to each line card in the optical line terminal; and
    the replicator of each line card receives global positioning system signals from each of the management cards of the optical line terminal and replicates the received global positioning system signals; and wherein each line card comprises multiple analyzer circuits, each receiving the replicated global positioning system signals from the replicator of the line card, each analyzer circuit:
  determining the signal drift and the phase precision for each global positioning system signal;
  comparing the signal drift of each global positioning system signal with the threshold signal drift;
  comparing the phase precision of each global positioning system signal with the threshold phase precision; and
  determining a failure of the global positioning system signal when the signal drift of the global positioning system signal is above the threshold signal drift or the phase precision of the global positioning system signal is below the threshold phase precision.

5. The system of claim 4, wherein the system manager identifies an analyzer circuit as a failure location when that analyzer circuit identifies a failure of a global positioning system signal while other analyzer circuits do not identify a failure of that global positioning system signal.

6. The system of claim 5, wherein the system manager identifies an analyzer circuit as a failure location when that analyzer circuit identifies a failure of a global positioning system signal while all or a statistically significant number of other analyzer circuits do not identify a failure of that global positioning system signal.

7. The system of claim 4, wherein the system manager identifies the replicator of a line card as a failure location when the analyzer circuits of that line card each identify a failure of a global positioning system signal while other analyzer circuits of other line cards of the same optical line terminal do not identify a failure of that global positioning system signal.

8. The system of claim 4, wherein the system manager identifies the replicator of a management card of an optical line terminal as a failure location when the analyzer circuits of every line card of that optical line terminal identifies a failure of a global positioning system signal while other analyzer circuits of other optical line terminals do not identify a failure of that global positioning system signal.

9. The system of claim 4, wherein the system manager identifies the replicator of a global positioning system receiver as a failure location when the analyzer circuits of every optical line terminal identifies a failure of a global positioning system signal while at least some of the analyzer circuits of the optical line terminals do not identify a failure of a global positioning system signal from another global positioning system receiver.

10. The system of claim 1, wherein each global positioning system signal comprises a frequency signal component, a pulse per second signal component, and a time-of-day component, the signal drift comprising a drift of the pulse per second signal component and a drift of the frequency signal component.

11. The system of claim 10, wherein the line card determines the signal drift of a signal by calculating:

$$J_i = g_J(J_i^F, J_i^P)$$

wherein $J_i$ is a total drift of a signal, $J_i^F$ is the frequency drift of a signal, $J_i^P$ is the pulse per second drift of the signal, and $g_J$ is a function of the frequency drift and the pulse per second drift of the signal.

12. The system of claim 10, wherein the phase precision comprises:
  an offline measurement of a propagation delay of the pulse per second component of the global positioning system signal between the global positioning system receiver and the analyzer circuit; and
  an online measurement of a relative phase offset of the pulse per second signal component, the relative phase offset determined based on a reference pulse per second reference signal.

13. The system of claim 12, wherein the reference signal is the received pulse per second signal component received at the analyzer circuit or a signal generated by a high-precision high-frequency oscillator.

14. The system of claim 13, wherein the line card determines the phase precision of the signal by calculating:

$$D_i = D_i^P - D_i^R$$

wherein $D_i$ is the phase precision of a signal, $D_i^P$ is the offline measurement of the propagation delay of the pulse per second signal component between the global positioning system receiver and the analyzer circuit, and $D_i^R$ is the online measurement of the relative phase offset of the pulse per second signal component.

15. A method comprising:
receiving a failure communication for a global positioning system signal from a signal distribution system when the signal drift of the global positioning system signal is above a threshold signal drift or the phase precision of the global positioning system signal is below a threshold phase precision, the signal distribution system comprising:
  global positioning system receivers, each receiving a global positioning system signal from a corresponding global positioning system satellite; and
  optical line terminals in communication with the global positioning system receivers, each optical line terminal comprising:
    a management card for each global positioning system receiver in communication with the optical line terminal, the management card receiving a global positioning system signal from a corresponding global positioning system receiver; and
    a line card collocated for each management card in the optical line terminal, each line card:
      receiving a global positioning system signal from each management card in the optical line terminal; and
      determining a signal drift and a phase precision for each global positioning system signal; and
  identifying a failure location of the global positioning system signal within the system based on one or more received failure communications.

16. The method of claim 15, further comprising identifying a line card as a failure location when the line card identifies a failure of a global positioning system signal while other line cards of the same optical line terminal do not identify a failure of the global positioning system signal.

17. The method of claim 15, further comprising identifying a management card of an optical line terminal as a failure location when every line card of that optical line terminal identifies a failure of a global positioning system signal while other line cards of other optical line terminals do not identify a failure of that global positioning system signal.

18. The method of claim 15, further comprising identifying a global positioning system receiver as a failure location when the line cards of every optical line terminal identifies a failure of a global positioning system signal while at least some of the line cards of the optical line terminals do not identify a failure of a global positioning system signal from another global positioning system receiver.

19. The method of claim 15, wherein the global positioning system receivers, the management cards, and the line cards each comprise a replicator, wherein:
- the replicator of each global positioning system receiver receives a global positioning system signal from its corresponding global positioning system satellite and replicates the received global positioning system signal for communication to the corresponding management card in each optical line terminal;
- the replicator of each management card receives a global positioning system signal from its corresponding global positioning system receiver and replicates the received global positioning system signal for communication to each line card in the optical line terminal; and
- the replicator of each line card receives global positioning system signals from each of the management cards of the optical line terminal and replicates the received global positioning system signals; and
- wherein each line card comprises multiple analyzer circuits, each receiving the replicated global positioning system signals from the replicator of the line card, each analyzer circuit:
  - determining the signal drift and the phase precision for each global positioning system signal;
  - comparing the signal drift of each global positioning system signal with the threshold signal drift;
  - comparing the phase precision of each global positioning system signal with the threshold phase precision; and
  - determining a failure of the global positioning system signal when the signal drift of the global positioning system signal is above the threshold signal drift or the phase precision of the global positioning system signal is below the threshold phase precision.

20. The method of claim 19, further comprising identifying an analyzer circuit as a failure location when that analyzer circuit identifies a failure of a global positioning system signal while other analyzer circuits do not identify a failure of that global positioning system signal.

21. The method of claim 19, further comprising identifying the replicator of a line card as a failure location when the analyzer circuits of that line card each identify a failure of a global positioning system signal while other analyzer circuits of other line cards of the same optical line terminal do not identify a failure of that global positioning system signal.

22. The method of claim 19, further comprising identifying the replicator of a management card of an optical line terminal as a failure location when the analyzer circuits of every line card of that optical line terminal identifies a failure of a global positioning system signal while other analyzer circuits of other optical line terminals do not identify a failure of that global positioning system signal.

23. The method of claim 19, further comprising identifying the replicator of a global positioning system receiver as a failure location when the analyzer circuits of every optical line terminal identifies a failure of a global positioning system signal while at least some of the analyzer circuits of the optical line terminals do not identify a failure of a global positioning system signal from another global positioning system receiver.

24. The method of claim 15, wherein each global positioning system signal comprises a frequency signal component, a pulse per second signal component, and a time-of-day component, the signal drift comprising a drift of the pulse per second signal component and a drift of the frequency signal component.

25. The method of claim 24, further comprising determining the signal drift of a signal by calculating:

$$J_i = g_J(J_i^F, J_i^P)$$

wherein $J_i$ is a total drift of a signal, $J_i^F$ is the frequency drift of a signal, $J_i^F$ is the pulse per second drift of the signal, and $g_J$ is a function of the frequency drift and the pulse per second drift of the signal.

26. The method of claim 24, wherein the phase precision comprises:
- an offline measurement of a propagation delay of a pulse per second component of the global positioning system signal between the global positioning system receiver and the analyzer circuit; and
- an online measurement of a relative phase offset of the pulse per second signal component, the relative phase offset determined based on a reference pulse per second reference signal.

27. The method of claim 26, wherein the reference signal is the received pulse per second signal component received at the analyzer circuit or a signal generated by a high-precision high-frequency oscillator.

28. The method of claim 27, further comprising determining the phase precision of the signal by calculating:

$$D_i = D_i^P - D_i^R$$

wherein $D_i$ is the phase precision of a signal, $D_i^P$ is the offline measurement of the propagation delay of the pulse per second signal component between the global positioning system receiver and the analyzer circuit, and $D_i^R$ is the online measurement of the relative phase offset of the pulse per second signal component.

29. A method comprising:
- for each optical line terminal in a signal distribution system:
  - receiving a global positioning system signal from each global positioning system receiver in the signal distribution system at a corresponding management card of the optical line terminal; and
- for each line card of each optical line terminal:
  - receiving a global positioning system signal from each management card in the optical line terminal;
  - determining a signal drift and a phase precision for each global positioning system signal; and
- when the signal drift of a global positioning system signal is above a threshold signal drift or the phase precision of the global positioning system signal is below a threshold phase precision, identifying a failure location of the global positioning system signal within the system.

30. The system of claim 29, further comprising:
- identifying a line card as a failure location when the line card identifies a failure of a global positioning system signal while other line cards of the same optical line terminal do not identify a failure of the global positioning system signal;
- identifying a management card of an optical line terminal as a failure location when every line card of that optical line terminal identifies a failure of a global positioning system signal while other line cards of other optical line terminals do not identify a failure of that global positioning system signal; and
- identifying a global positioning system receiver as a failure location when the line cards of every optical line terminal identifies a failure of a global positioning system signal while at least some of the line cards of the optical line terminals do not identify a failure of a global positioning system signal from another global positioning system receiver.

\* \* \* \* \*